United States Patent
Park et al.

(10) Patent No.: US 12,505,936 B2
(45) Date of Patent: Dec. 23, 2025

(54) FLEXIBLE CONDUCTOR AND METHOD FOR MANUFACTURING SAME

(71) Applicant: Asen company, Seoul (KR)

(72) Inventors: Jin Woo Park, Seoul (KR); Ji Wan Jeon, Seoul (KR)

(73) Assignee: ASEN COMPANY, Seoul (KR)

( * ) Notice: Subject to any disclaimer, the term of this patent is extended or adjusted under 35 U.S.C. 154(b) by 0 days.

(21) Appl. No.: 18/982,402

(22) Filed: Dec. 16, 2024

(65) Prior Publication Data
US 2025/0239380 A1 Jul. 24, 2025

(30) Foreign Application Priority Data
Jan. 23, 2024 (KR) .................. 10-2024-0010375
Dec. 5, 2024 (KR) .................. 10-2024-0179884

(51) Int. Cl.
- *B05D 5/12* (2006.01)
- *H01B 1/20* (2006.01)
- *H01B 5/02* (2006.01)
- *H01B 13/30* (2006.01)

(52) U.S. Cl.
CPC ............. *H01B 1/20* (2013.01); *B05D 5/12* (2013.01); *H01B 5/02* (2013.01); *H01B 13/30* (2013.01)

(58) Field of Classification Search
CPC . H01B 1/00; H01B 1/127; H01B 1/20; H01B 5/00; B05D 5/12; C09D 5/24
See application file for complete search history.

(56) References Cited

U.S. PATENT DOCUMENTS

| | | | |
|---|---|---|---|
| 8,338,546 B2 * | 12/2012 | Kim | C08L 65/00 524/386 |
| 11,499,007 B2 * | 11/2022 | Wang | C09D 165/00 |
| 11,653,510 B2 * | 5/2023 | Park | B82Y 10/00 257/40 |
| 2010/0270055 A1 * | 10/2010 | Zheng | C08G 18/4833 252/500 |
| 2024/0400823 A1 * | 12/2024 | Ouyang | A61B 5/259 |

FOREIGN PATENT DOCUMENTS

| | | | | |
|---|---|---|---|---|
| CN | 106459487 A | * | 2/2017 | ............ C08L 101/12 |
| KR | 20190005666 A | * | 1/2019 | ............... C08K 3/04 |
| KR | 10-2242688 B1 | | 4/2021 | |

OTHER PUBLICATIONS

Kateb et al "Printable, adhesive, and self-healing dry epidermal electrodes based on PEDOT:PSS and polyurethane diol", Flex. Print. Electron. 8 (2023) 045006.*
Kayser et al "Stretchable Conductive Polymers and Composites Based on PEDOT and PEDOT:PSS", Adv. Mater. 2019, 31, 1806133.*
(Continued)

*Primary Examiner* — Mark Kopec
(74) *Attorney, Agent, or Firm* — LEX IP MEISTER, PLLC

(57) ABSTRACT

An embodiment provides a flexible conductor that is flexible and conductive by mixing a conductive polymer, PEDOT-PSS, with a polymer material, polyurethane (PU), and a surfactant, and a method for manufacturing the same. The flexible conductor possesses both self-adhesive and self-healing properties, along with a cell viability of 80% or more, and is biocompatible.

8 Claims, 24 Drawing Sheets

(56) References Cited

OTHER PUBLICATIONS

He et al "Enhancements in the Mechanical Stretchability and Thermoelectric Properties of PEDOT:PSS for Flexible Electronics Applications", Acc. Mater. Res. 2020, 1, 146-157.*
Li et al "Recent Progress on Self-Healable Conducting Polymers", Adv. Mater. 2022, 34, 2108932.*
Cuttaz et al "Conductive elastomer composites for fully polymeric, flexible bioelectronics", Biomater. Sci., 2019, 7, 1372.*

* cited by examiner

FLEXIBLE CONDUCTOR AND METHOD FOR MANUFACTURING SAME

CROSS-REFERENCE TO RELATED APPLICATIONS

This application claims the priority of Korean Patent Application Nos. 10-2024-0010375 filed on Jan. 23, 2024, and 10-2024-0179884 filed on Dec. 5, 2024, in the Korean Intellectual Property Office, the disclosure of which is incorporated herein by reference.

BACKGROUND

The disclosure relates to a flexible conductor and a method for manufacturing the same, and more specifically, to a flexible conductor that is flexible and conductive by mixing a conductive polymer, PEDOT-PSS, with a polymer material, polyurethane (PU), and a surfactant, and a method for manufacturing the same.

Wearable devices play an important role in connecting people and devices. More specifically, wearable devices are attached to the tissues of the body or organs to identify and transmit information, and are used for the purpose of maintaining homeostasis or for convenience.

Conventional wearable devices are large in size and made of hard materials, so they are uncomfortable to wear due to the difference with soft human tissues, and there is a limit to accurately transmitting information by completely attaching to a curved surface.

PEDOT-PSS, a conductive polymer, has high conductivity, but it is difficult to provide flexibility. In the past, in order to provide flexibility to the material, a scheme was used to artificially increase the bonds between chains of PEDOT-PSS or to mix it with a polymer, but this scheme reduces the conductivity, so there is a problem that this is difficult to use as an electrode material.

In addition, in order to increase the conductivity of the material, secondary doping must be used by adding a substance such as DMSO, but in this case, contrary to the above, there is a problem that the flexibility of the material decreases.

If conductive polymers are made flexible in an easy way, they can show good performance in wearable devices.

The development of flexible and soft electrode materials is essential in the field of wearable devices because they have similar properties to the surface of living tissue when used in bio-devices, so they can accurately transmit information between the device and the tissue by contacting the tissue surface without resistance and can also easily provide micro-stimulation.

RELATED ART DOCUMENT

Patent Document

Republic of Korea Patent No. 10-2242688

SUMMARY

An aspect of the disclosure is to develop an electrode having self-healing properties and self-adhesion properties on various surfaces while being stretched, using a polymer, PEDOT:PSS, and a plasticizer, thereby providing a material that can be used in wearable devices or replace ACF.

The aspect of the disclosure is not limited to that mentioned above, and other aspects not mentioned will be clearly understood by those skilled in the art from the description below.

An embodiment of the disclosure provides a flexible conductor.

According to an embodiment of the disclosure, the flexible conductor may include polyurethane, PEDOT:PSS, and a plasticizer.

In addition, according to an embodiment of the disclosure, the plasticizer may be polyethylene glycol tert-octylphenyl ether (TRITON-X™).

In addition, according to an embodiment of the disclosure, the flexible conductor may include, with respect to 100 parts by weight of the polyurethane, 10 to 40 parts by weight of the PEDOT:PSS; and 10 to 50 parts by weight of the plasticizer.

In addition, according to an embodiment of the disclosure, the flexible conductor may include, with respect to 100 parts by weight of the polyurethane, 20 to 25 parts by weight of the PEDOT:PSS; and 10 to 30 parts by weight of the plasticizer.

In addition, according to an embodiment of the disclosure, the flexible conductor may have both self-adhesive properties and self-healing properties.

In addition, according to an embodiment of the disclosure, the flexible conductor may have a cell viability of 80% or more and may be biocompatible.

Another embodiment of the disclosure provides a method for manufacturing a flexible conductor.

According to an embodiment of the disclosure, the method may include: providing a solution comprising polyurethane; adding PEDOT:PSS and a plasticizer to the provided solution to form a mixed solution; and processing the formed mixed solution into a film form.

In addition, according to an embodiment of the disclosure, in the method, the plasticizer may be polyethylene glycol tert-octylphenyl ether (TRITON-X™).

In addition, according to an embodiment of the disclosure, in the forming of the mixed solution, with respect to 100 parts by weight of the polyurethane, 10 to 40 parts by weight of the PEDOT:PSS; and 10 to 50 parts by weight of the plastisizer) may be added.

In addition, according to an embodiment of the disclosure, in the processing into the film form, the formed mixed solution may be processed into a film form by at least one scheme selected from the group consisting of drying, spin coating, drop casting, spray coating, vacuum deposition, and dip coating.

In addition, according to an embodiment of the disclosure, the processing into the film form may include at least one selected from: manufacturing a film of a desired shape through a solution dispenser device; and manufacturing a film with a desired pattern through screen printing.

In addition, according to an embodiment of the disclosure, in the method, a cell viability of 80% or more may be ensured to ensure biocompatibility.

According to an embodiment of the disclosure, it is possible to provide a flexible conductor that is flexible and conductive by mixing a conductive polymer, PEDOT-PSS, with a polymer material, Polyurethane (PU), and a surfactant, and a method for manufacturing the same.

According to an embodiment of the disclosure, it is possible to provide a flexible conductor capable of self-healing and self-adhesion that maintains conductivity and flexibility even when reattached after being cut, and, due to the characteristics of its own structure, has a very strong bond between conductor materials, and a method for manufacturing the same.

The effects of the disclosure are not limited to the effects described above, and should be understood to include all effects that are inferable from the configuration of the disclosure described in the detailed description or claims of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 14A, 14B, 14C, and 14D are graphs comparing the elongation of a flexible conductor according to an embodiment of the disclosure and a conventional conductor after attachment to various substrates, wherein FIG. 14A is a graph of elongation when using a conventional method, FIG. 14B is a graph of elongation when using this embodiment, FIG. 14C is a graph comparing the difference in elongation when there is a plasticizer and when there is not, and FIG. 14D is a graph comparing the difference in electrical conductivity according to the plasticizer ratio;

FIGS. 17A, 17B, and 17C show the results of the Biocompatibility test, wherein FIG. 17A is an image showing the results of the live/dead cell staining assay, in which the amount of cells increasing each day was observed under a microscope, FIG. 17B is a graph showing the results of the DNA Content Assay, and FIG. 17C is a graph showing the results of measuring cell viability using the CCK-8 Assay.

DETAILED DESCRIPTION

Figure 1:
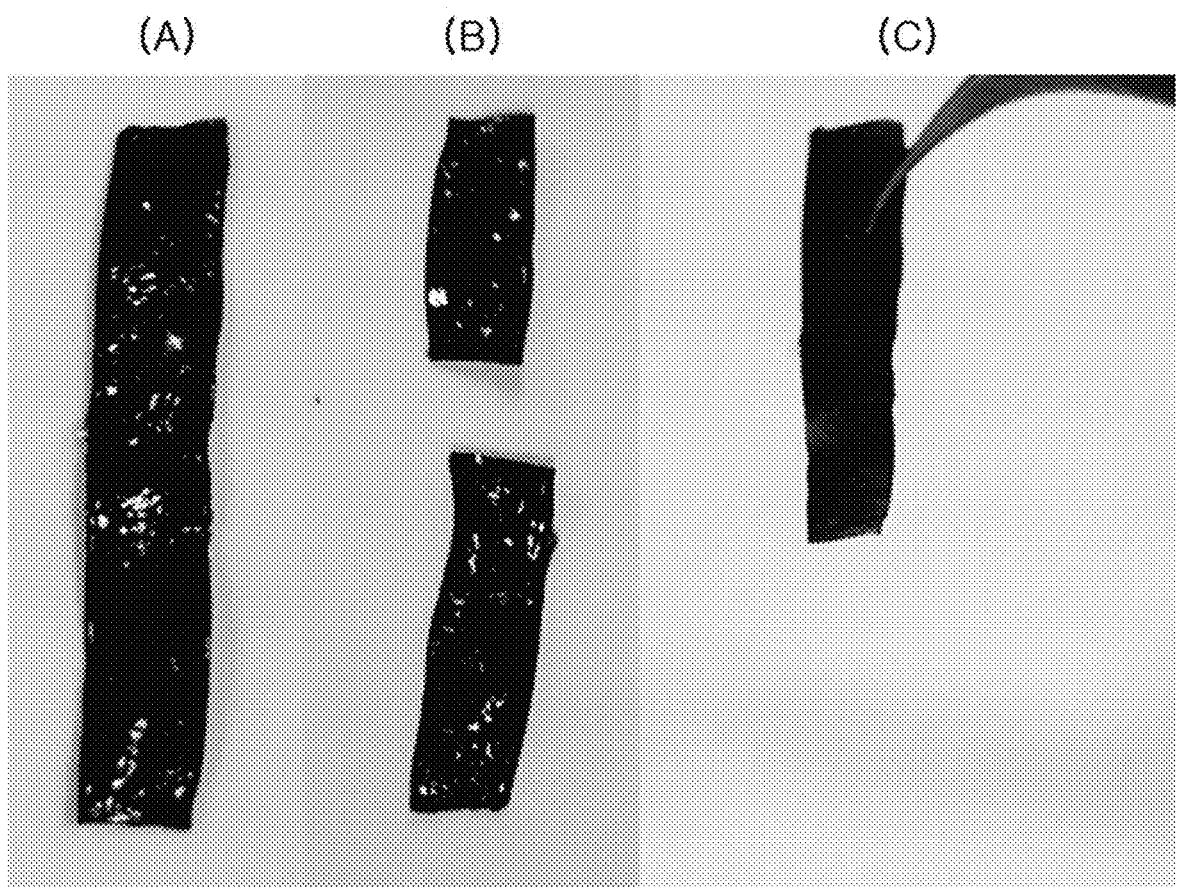
FIG. 1 is actual photographs showing the self-healing appearance of a flexible conductor after bonding a cut surface according to an embodiment of the disclosure.

Hereinafter, the disclosure will be described with reference to the accompanying drawings. However, the disclosure may be implemented in various different forms, and therefore is not limited to the embodiments described herein.

In addition, in order to clearly describe the disclosure in the drawings, parts that are not related to the description are omitted, and similar parts are given similar drawing reference numerals throughout the specification.

In the entire specification, when a part is said to be "connected (linked, contacted, coupled)" to another part, this includes not only the case where it is "directly connected" but also the case where it is "indirectly connected" with another member in between.

In addition, when a part such as a layer, film, region, or plate is said to be "on" another part, this includes not only the case where it is "directly on" another part, but also the case where there is another part in between. In addition, in this specification, when a part such as a layer, film, region, or plate is formed on another part, the direction in which it is formed is not limited to the upper direction, and includes being formed in the side or lower direction. On the other hand, when a part such as a layer, film, region, or plate is said to be "under" another part, this includes not only the case where it is "directly under" another part, but also the case where there is another part in between.

In this specification, the terms "upper surface" and "lower surface" are used as relative concepts in order to easily explain the technical idea of the disclosure. Therefore, the terms "upper surface" and "lower surface" do not refer to a specific direction, position, or component, and are interchangeable with each other.

For example, the "upper surface" may be interpreted as the "lower surface," and the "lower surface" may be interpreted as the "upper surface." Therefore, the "upper surface" may be expressed as "first" and the "lower surface" may be expressed as "second", or the "lower surface" may be expressed as "first" and the "upper surface" may be expressed as "second". However, within one embodiment, the terms "upper surface" and "lower surface" are not used interchangeably.

Unless otherwise defined, all terms used herein, including technical or scientific terms, have the same meaning as generally understood by a person of ordinary skill in the art to which the disclosure belongs. Terms defined in commonly used dictionaries should be interpreted as having a meaning consistent with the meaning they have in the context of the relevant technology, and shall not be interpreted in an ideal or overly formal sense unless explicitly defined in this application.

In addition, when a part is said to "include" a certain component, this does not exclude other components unless specifically stated to the contrary, but rather means that other components may be additionally provided.

The terms used in this specification are used only to describe specific embodiments and are not intended to limit the disclosure. The singular expression includes the plural expression unless the context clearly indicates otherwise. In this specification, the terms "include" or "have" are intended to specify the presence of a feature, number, step, operation, component, part, or combination thereof described in the specification, but should be understood as not excluding in advance the possibility of the presence or addition of one or more other features, numbers, steps, operations, components, parts, or combinations thereof.

Hereinafter, embodiments of the disclosure will be described in detail with reference to the accompanying drawings.

A flexible conductor according to an embodiment of the disclosure will be described.

As an example of the above embodiment, there may be a flexible conductor characterized by including polyurethane, PEDOT:PSS, and a plasticizer.

As described above, when a conductive polymer, PEDOT-PSS, is mixed with a polymer material, polyurethane (PU), and a surfactant, a flexible and conductive conductor material may be obtained.

The flexible conductor according to the above embodiment is a self-healing and self-adhesive material that maintains conductivity and flexibility even when reattached after being cut because the electrical attraction between molecular chains of the polymer material is strong,
  the chain becomes flexible and the volume within the chain increases due to the surfactant that is added, and the bond between conductor materials is very strong due to the continuous connection of the conductive polymer.

As an example of the above embodiment, there may be a flexible conductor characterized in that the plasticizer is Polyethylene glycol tert-octylphenyl ether (TRITON-X™).

In the past, there was no example of manufacturing a flexible conductor that simultaneously had self-adhesive properties and self-healing properties among flexible conductors using conductive polymers,
  whereas in the case of the above embodiment, the flexible conductor has a stable resistance change even when it is stretched to twice its length. This may be confirmed through the following experimental examples.

In the case of the flexible conductor according to the above embodiment, it has self-healing properties and self-adhesive properties at the same time,
  and as a flexible conductor that stretches to 10 times its existing length, has the advantage of being able to exhibit good performance when used as a flexible electrode in a wearable device.

As an example of the above embodiment, there may be a flexible conductor characterized by including, with respect to 100 weight parts of the polyurethane, 10 to 40 weight parts of the PEDOT:PSS; and 10 to 50 weight parts of the plasticizer.

As described above, the flexible conductor includes polyurethane, PEDOT:PSS, and TRITON-X™, wherein
  at this time, when the PEDOT:PSS is added to the polyurethane, the electrical connection and mechanical connection of the added polymer materials are evenly spread over the entire range, thereby creating a flexible and stretchable conductor material, and
  and when the TRITON-X™ is added to the polyurethane, the modulus of the polymer is lowered and flexibility is increased, thereby making it stretch more and having a property of easily adhering to skin or other substrates, and increasing the conductivity of the conductive polymer.

However, in the content of the flexible conductor, if the PEDOT:PSS is included in excess of a certain amount, the conductivity increases, but the flexibility decreases, so that it deviates from the definition of a flexible conductor material, and if it is included in less than a certain amount, the conductivity decreases, making it difficult to use as a conductor.

In addition, in the content of the flexible conductor, if the TRITON-X™ is included in excess of a certain amount, the flexibility and self-healing properties increase, but the conductivity increases and the modulus decreases significantly, so that there may be a problem that the durability becomes weak in repeated use, and if it is included in low amounts, the conductivity also decreases, so that there may be a problem to use as a conductor.

Therefore, with respect to 100 parts by weight of the polyurethane, if the PEDOT:PSS material is included in less than 10 parts by weight,
  there is a problem that the effect of maintaining high conductivity at the high flexibility described above cannot be sufficiently obtained, and
  on the other hand, for 100 parts by weight of the polyurethane, if the PEDOT:PSS material is included in more than 40 parts by weight, there may be a problem in that the conductivity increases but it is no longer flexible.

Similarly, with respect to 100 parts by weight of the polyurethane, if the TRITON-X™ is included in less than 10 parts by weight, there is a problem in that the aforementioned modulus is low enough to be used in a wearable device and the effect of high flexibility cannot be sufficiently obtained, and
  on the other hand, with respect to 100 parts by weight of the polyurethane, if the TRITON-X™ is included in more than 50 parts by weight, there may be a problem in that the durability is reduced in repeated use and the conductivity is low.

As an example having the most preferable content ratio, there may be a flexible conductor characterized by including, with respect to 100 weight parts of the polyurethane, 20 to 25 weight parts of the PEDOT:PSS; and 10 to 30 weight parts of the plasticizer.

As an example of the above embodiment, there may be a flexible conductor characterized by having self-adhesive properties and self-healing properties at the same time.

In the case of the flexible conductor according to the above embodiment, by mixing polymer (polyurethane), PEDOT:PSS, and TRITON-X™ at an appropriate content ratio, a stretchable conductor having an electrical resistance of 5 ohm/sq or less and a conductivity of 100 S/cm may be provided.

In general, when the electrical resistance is formed to be 20 ohm/sq or less or 40 S/cm or more, it may be utilized as a wearable device, and it is expected that the flexible conductor according to the above embodiment may be utilized as a wearable device.

By adding TRITON-X™ to polyurethane and PEDOT: PSS, a polymer with low modulus and high elongation may be formed,
  which not only has low resistance characteristics, but also has the advantage of having almost no change in conductor resistance even when stretched up to 100%, and being able to stretch up to about 10 times the original length.

As described above, the flexible conductor has self-adhesive and self-healing characteristics when cut and reattached, so it may stretch up to about 10 times the original length,
  and the resistance when cut and reattached is also not significantly different from the original resistance, as confirmed through the following experimental examples.

In the case of the flexible conductor of the above example, it may be electrically connected by attaching it to the skin, and may serve as an interface between the body and the device, and may be easily attached between the device and the conductor using the self-adhesive characteristics.

Referring to the experimental examples below, it may be confirmed that the flexible conductor according to the above embodiment may be attached to various substrates such as PDMS, silicon wafer, glass, and PI, and by utilizing these characteristics, it has the advantage of being able to be easily connected to a flexible PCB and easily encapsulated.

In addition, the flexible conductor according to the above embodiment has low modulus, high stretchability, self-healing, and low resistance characteristics, so it may be used as a wearable device, and
  may be utilized as a substitute material for commercialized ACFs that currently have little stretchability through self-adhesive characteristics that adhere to various substrates.

In addition, since encapsulation is easy and biocompatible, it may be sufficiently utilized as an implantable device that penetrates into the body.

In relation to the biocompatibility,
  the flexible conductor according to the above embodiment has a cell viability of 80% or more, so it may be characterized as having biocompatibility.

The above cell viability means cell survival rate, and is a value that measures the ability of cells to survive and maintain function under specific conditions, and
  throughout this specification, the above cell viability percent of control is a value that expresses the cell survival number under the analysis target condition as a percentage based on the cell survival number under the positive control condition.

For example, if the cell viability is 100 in the positive control at the reference point and 90 in the analysis target condition at the reference point, the cell viability of the analysis target is 90%.

At this time, the positive control means obtaining data under conditions where no action is taken on the cells.

That is, the cell viability is an indicator that may be used to determine whether the cell survival environment is somewhat prepared under the analysis target condition compared to the natural condition positive control, and through this, the biocompatibility of the analysis target may be determined.

In the case of the flexible conductor according to the above embodiment, as described above, the cell viability is 80% or more, which means that the flexible conductor does not cause toxicity to cells and is biocompatible.

The above figure of 80% or more means that most cells may survive, and this material has biocompatibility.

In measuring the above cell viability, a cell line derived from normal subcutaneous fat tissue of a C3H/An male mouse called L-929 may be used.

The above L-929 is a cell line widely used for toxicity evaluation, and it reacts sensitively to toxic substances and has high reproducibility of experimental results, so reliable data may be obtained.

The related contents may be confirmed more specifically through experimental example 4 below.

A flexible conductor manufacturing method according to another embodiment of the disclosure will be described.

Since the flexible conductor manufacturing method is a different category of invention having substantially the same technical configuration as the above-described flexible conductor, the contents described above for the flexible conductor may be applied as is.

As an example of the above embodiment, there may be a flexible conductor manufacturing method characterized by including: preparing a solution including polyurethane; adding PEDOT:PSS and a plasticizer to the prepared solution to form a mixed solution; and processing the formed mixed solution into a film form.

As an example of the above embodiment, the plasticizer may be polyethylene glycol tert-octylphenyl ether (TRITON-X™).

As an example of the above embodiment, in the forming of the mixed solution, with respect to 100 parts by weight of the polyurethane, 10 to 40 parts by weight of the PEDOT: PSS; and 10 to 50 parts by weight of the plasticizer may be added.

More preferably, as an example of the above embodiment, in the forming of the mixed solution, 20 to 25 parts by weight of the PEDOT:PSS; and 10 to 30 parts by weight of the plasticizer may be added with respect to 100 parts by weight of the polyurethane.

As an example of the above embodiment, the processing into the film form may process the formed mixed solution into a film form through at least one method selected from the group consisting of drying, Spin coating, Drop Casting, Spray Coating, Vacuum Deposition, and Dip Coating.

As an example of the above embodiment, the processing into the film form may include at least one of: manufacturing a film of a desired shape through a solution dispenser device; and manufacturing a film having a desired pattern through screen printing.

In relation to the biocompatibility of the disclosure,
  as an example of the above embodiment, there may be a flexible conductor manufacturing method characterized by making the cell viability 80% or higher, thereby having biocompatibility.

Manufacturing Example 1. Flexible Conductor Manufacturing According to an Embodiment 1. 1 g of PU is added to a solution containing 9.5 ml of ethanol and 0.5 ml of DI water, and stirred at 300 rpm for 12 hours at room temperature to form a PU solution.

2. Trtion-X (manufactured as 0.1 g, 0.2 g, 0.3 g, and 0.5 g, respectively) and PEDOT:PSS (manufactured as 0.1 g, 0.2 g, 0.25 g, 0.3 g, and 0.5 g, respectively) are added to the formed PU solution to form a mixed solution.
3. The formed mixed solution is stirred at 300 rpm for 12 hours at room temperature to produce a PU_PEDOT_TX solution.

At this time, with respect to 100 parts by weight of the Pu, the TRITON-X™ is included in an amount of 10 to 50 parts by weight, and the PEDOT:PSS is included in an amount of 10 to 40 parts by weight.

4. The PU_PEDOT_TX solution produced above is produced in a film form using a method of drying at room temperature for one day and a method of performing spin coating (500-1000 rpm, 30 s), respectively.

Experimental Example 1. Analysis of Self-Healing and Self-Adhesive Properties of Flexible Conductors According to Embodiments FIG. 1 is actual photographs showing the self-healing appearance of a flexible conductor after bonding a cut surface according to an embodiment of the disclosure.

Figure 2:
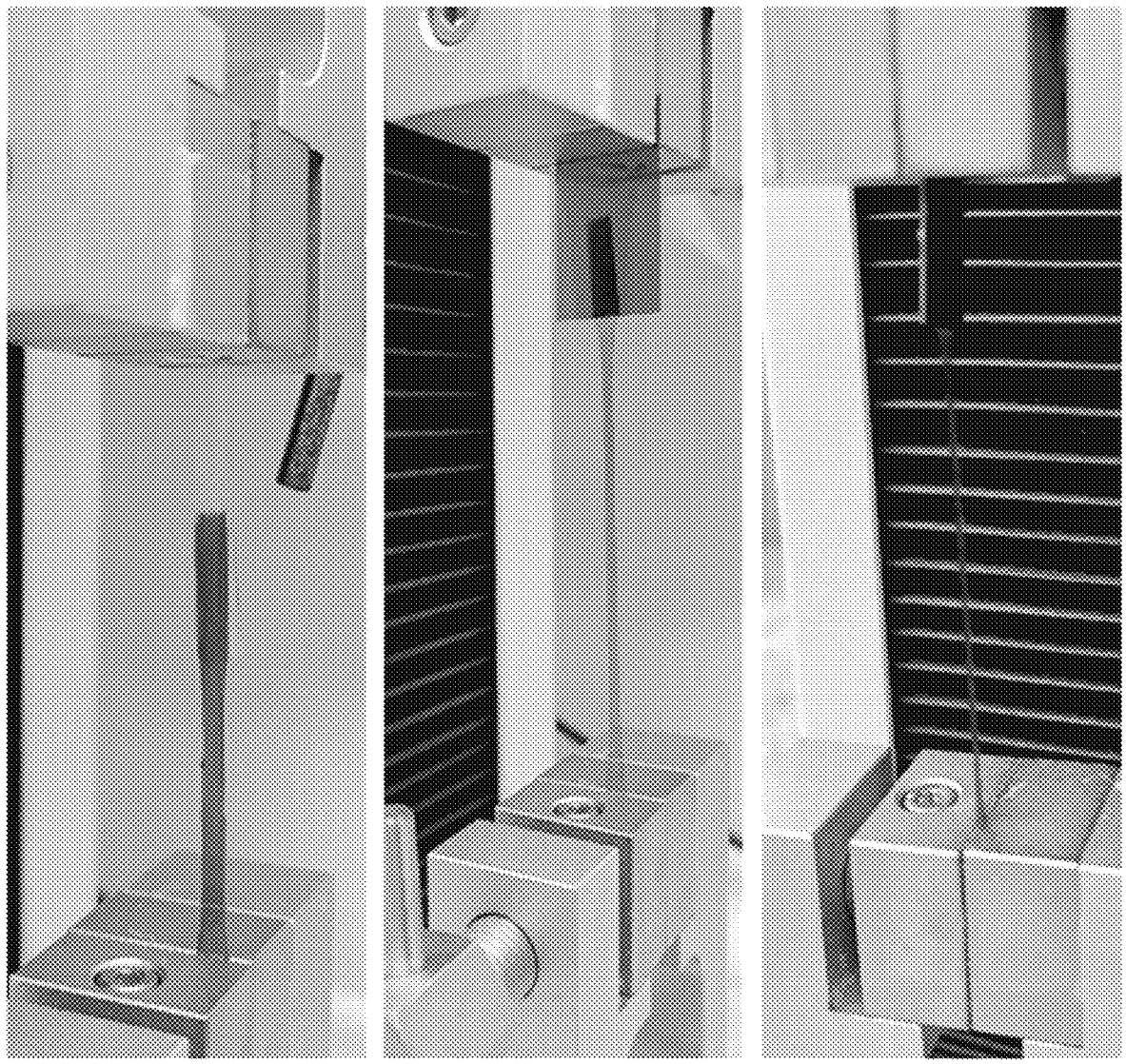
FIG. 2 is actual photographs showing an adhesion experiment conducted by applying a flexible conductor according to an embodiment of the disclosure to various substrates.

FIG. 2 is actual photographs showing an adhesion experiment conducted by applying a flexible conductor according to an embodiment of the disclosure to various substrates.

Figure 3:
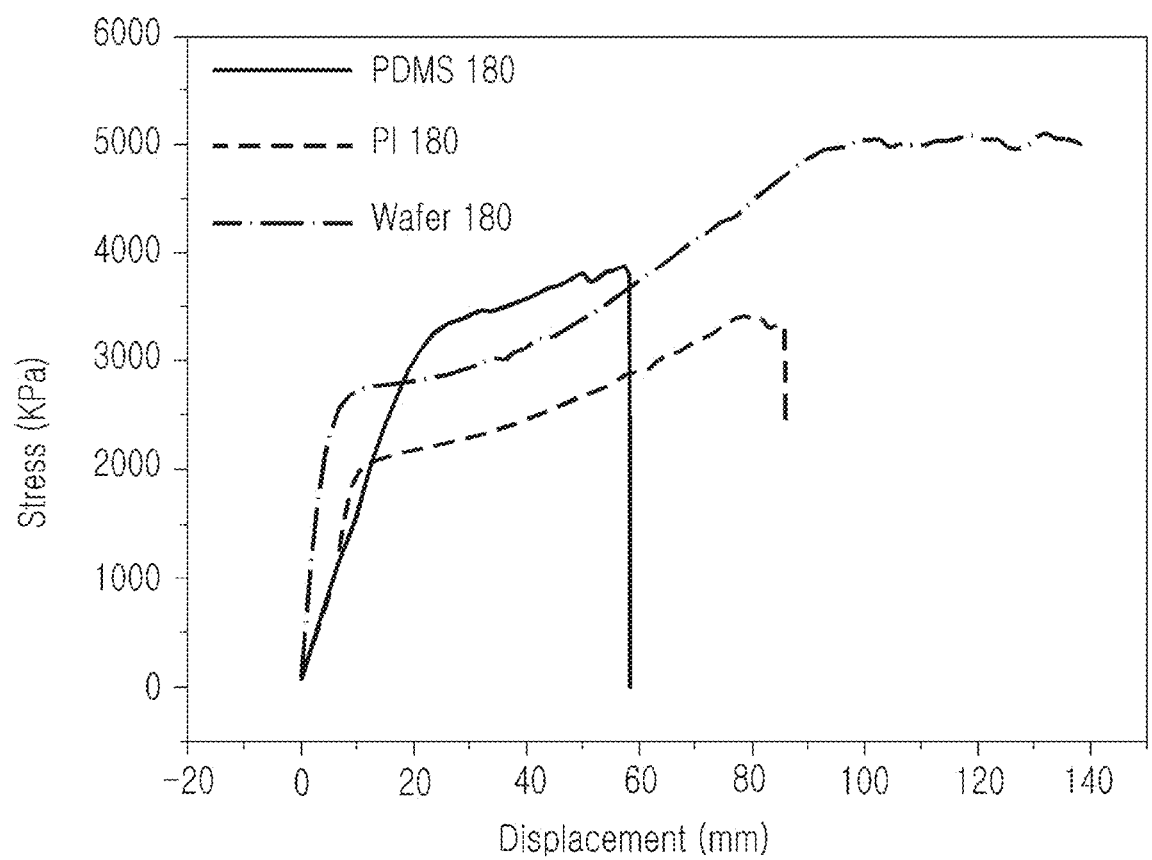
FIG. 3 is a graph showing the results of an adhesion experiment in which a flexible conductor according to an embodiment of the disclosure was applied to various substrates.

FIG. 3 is a graph showing the results of an adhesion experiment in which a flexible conductor according to an embodiment of the disclosure was applied to various substrates.

Figure 4:
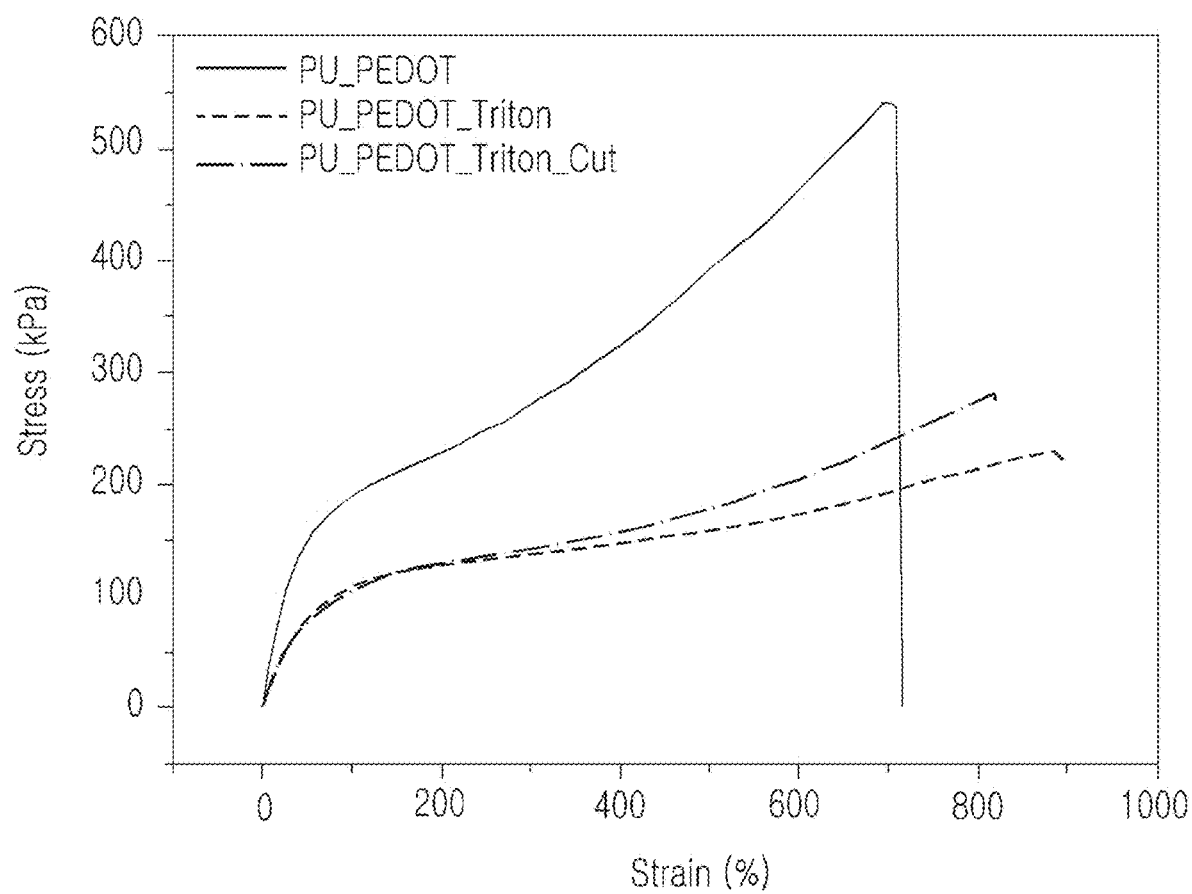
FIG. 4 is a graph comparing the results of a tensile experiment of a flexible conductor according to an embodiment of the disclosure with the results of a tensile experiment of a conventional material.

FIG. 4 is a graph comparing the results of a tensile experiment of a flexible conductor according to an embodiment of the disclosure with the results of a tensile experiment of a conventional material.

Figure 5:
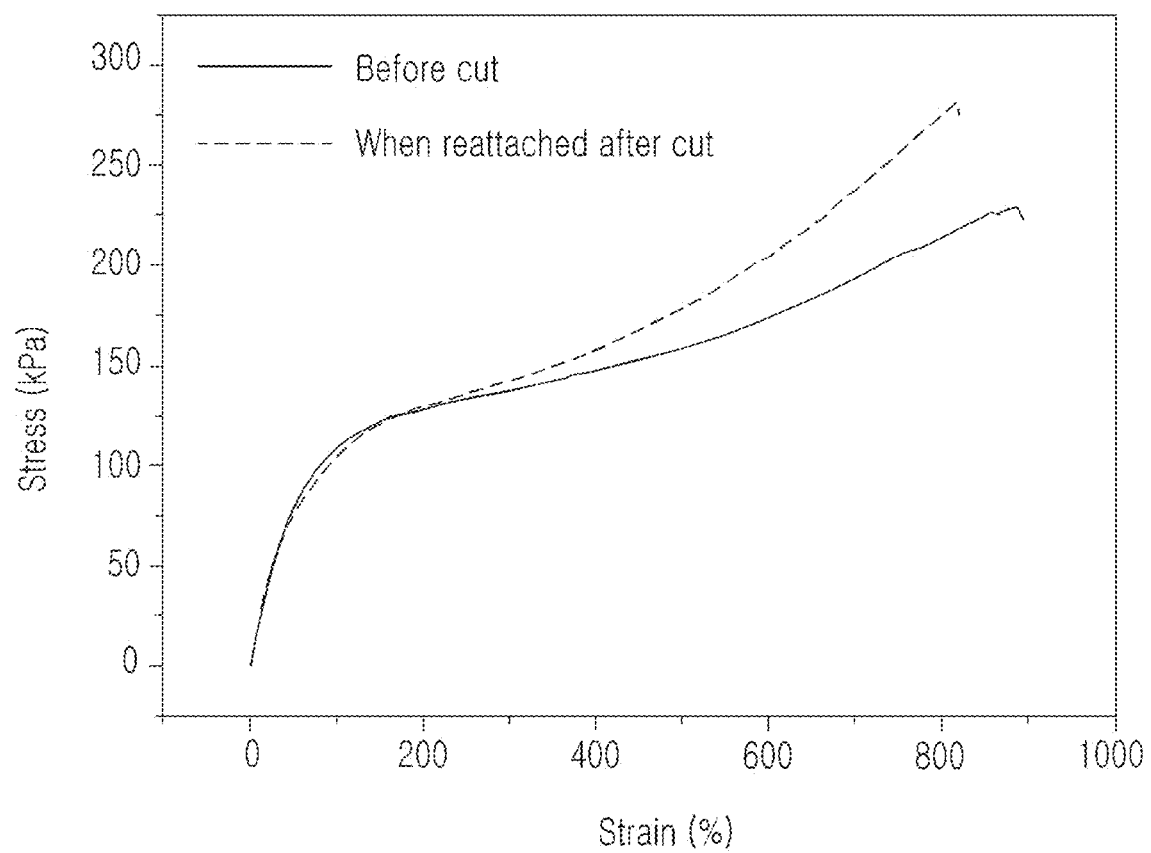
FIG. 5 is a graph comparing the results of a tensile experiment before and after cutting a flexible conductor according to an embodiment of the disclosure.

FIG. 5 is a graph comparing the results of a tensile experiment before and after cutting a flexible conductor according to an embodiment of the disclosure.

Figure 6:
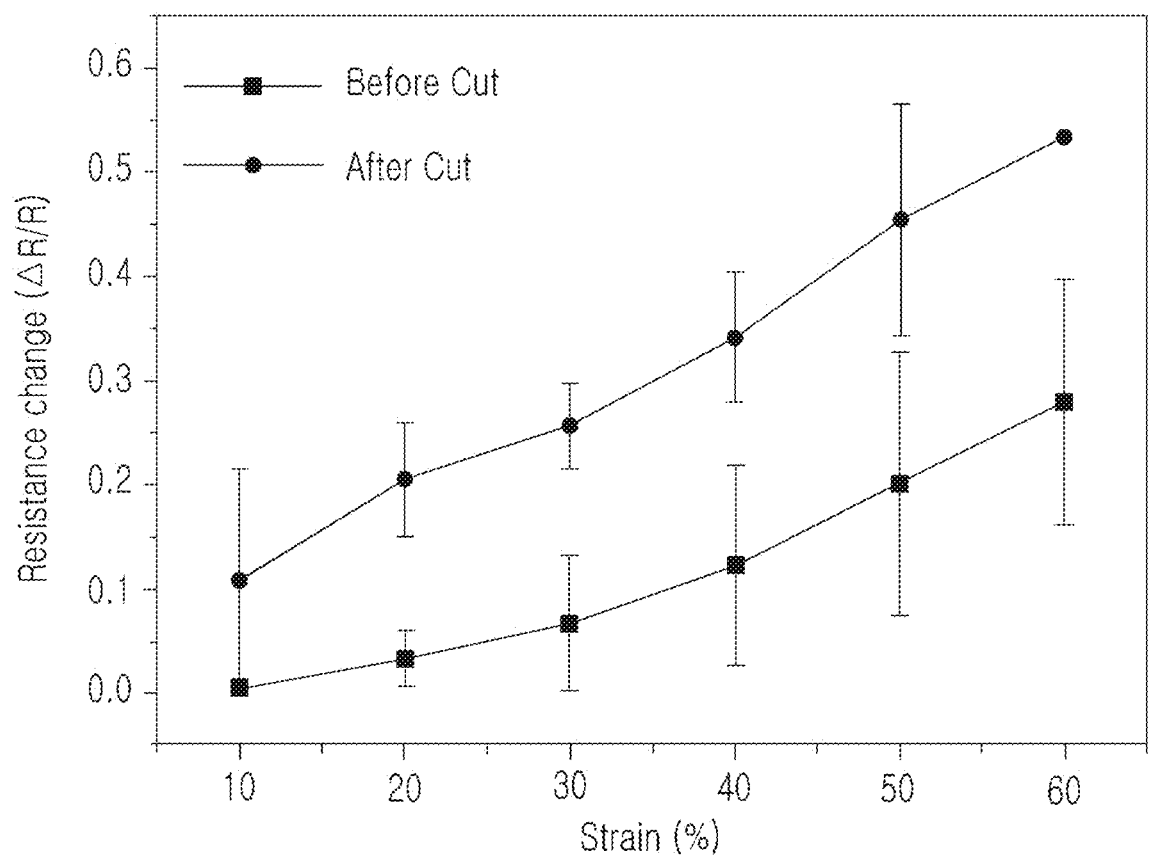
FIG. 6 is a graph comparing the resistance change rate according to tension before/after cutting a flexible conductor according to an embodiment of the disclosure.

FIG. 6 is a graph comparing the resistance change rate according to tension before/after cutting a flexible conductor according to an embodiment of the disclosure.

Figure 8:
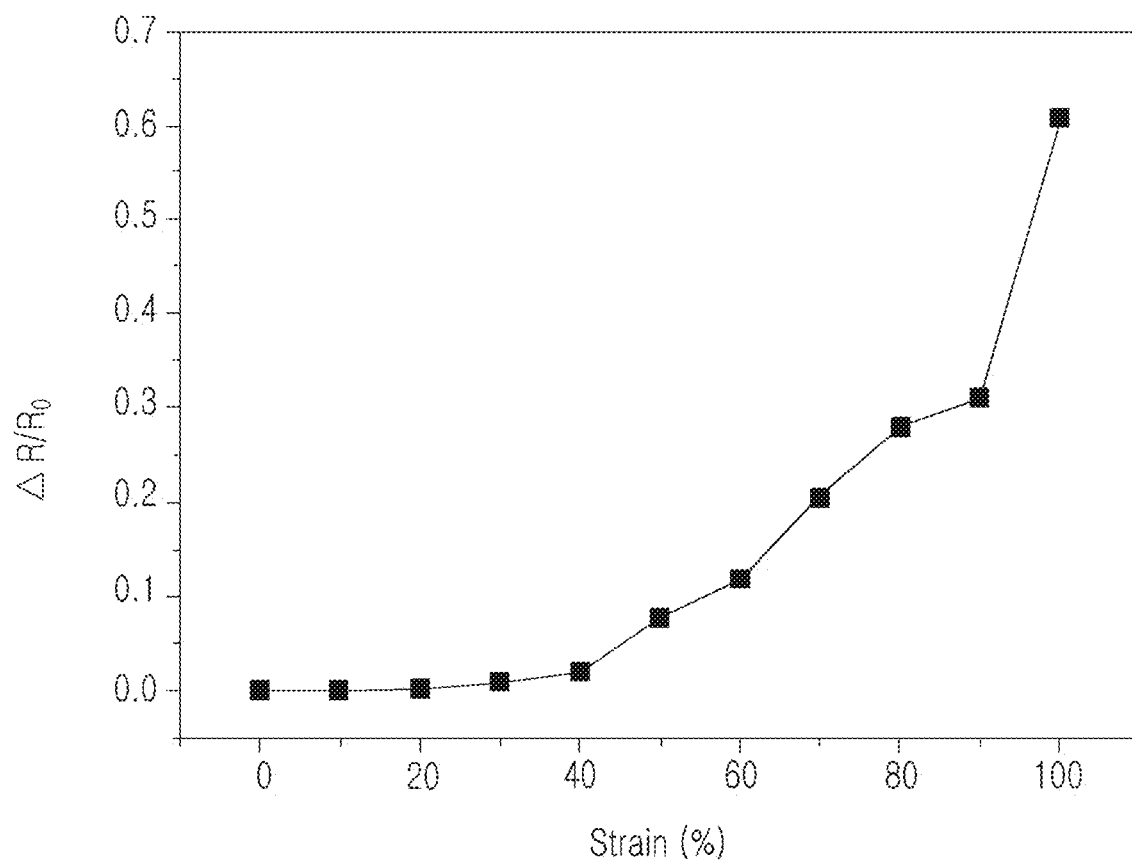
FIG. 8 is a graph showing the change in resistance according to tension after cutting a flexible conductor according to an embodiment of the disclosure.

FIG. 8 is a graph showing the change in resistance according to tension after cutting a flexible conductor according to an embodiment of the disclosure.

Figure 10:
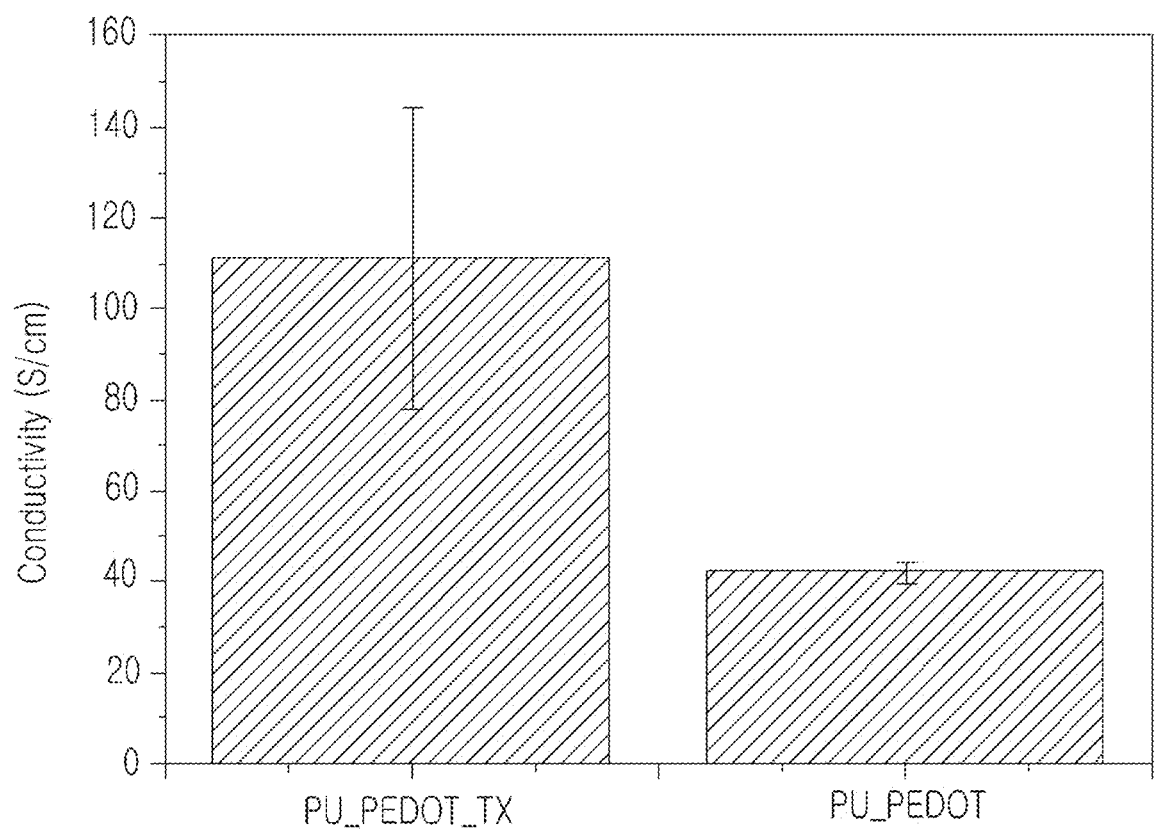
FIG. 10 is a graph showing experimental data comparing the conductivity of a flexible conductor according to an embodiment of the disclosure with a comparative material.

FIG. 10 is a graph showing experimental data comparing the conductivity of a flexible conductor according to an embodiment of the disclosure with a comparative material.

Figure 11:
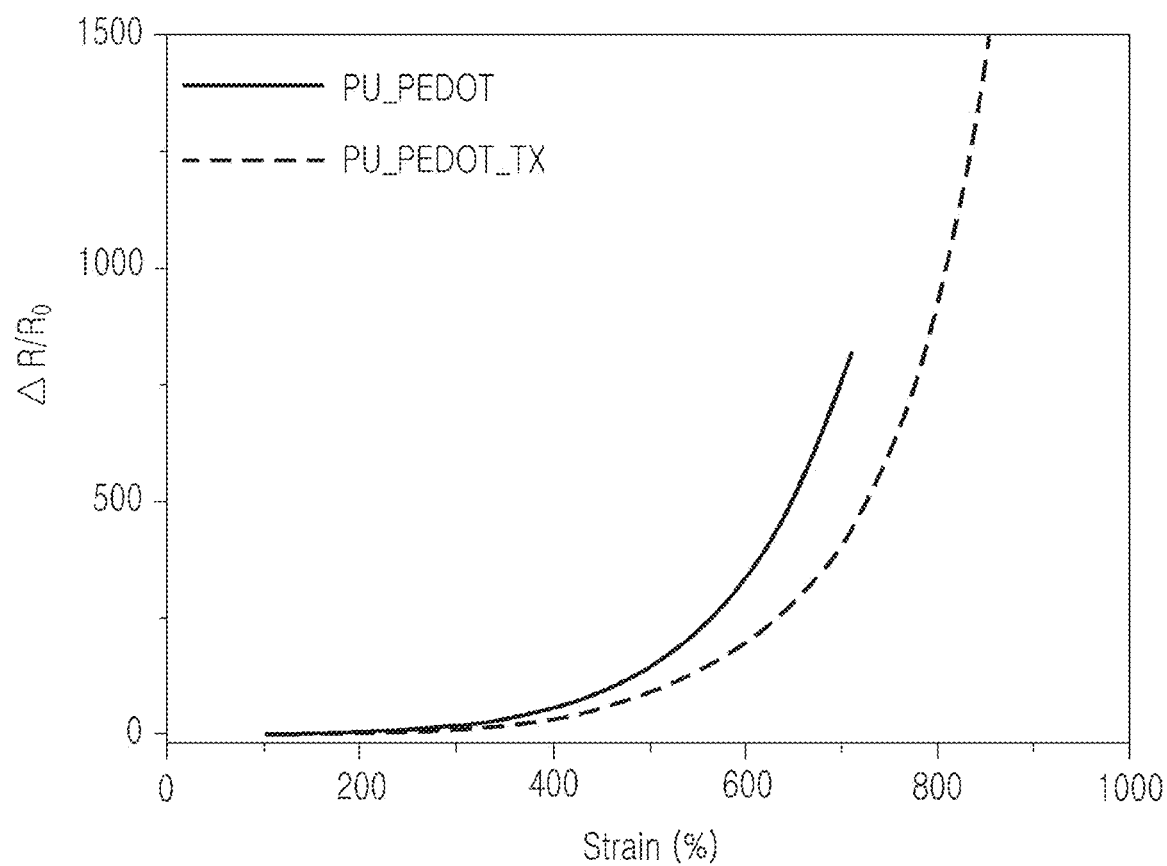
FIG. 11 is a graph showing experimental data comparing the change in resistance according to tension of a flexible conductor according to an embodiment of the disclosure with a comparative material.

FIG. 11 is a graph showing experimental data comparing the change in resistance according to tension of a flexible conductor according to an embodiment of the disclosure with a comparative material.

Figure 12:
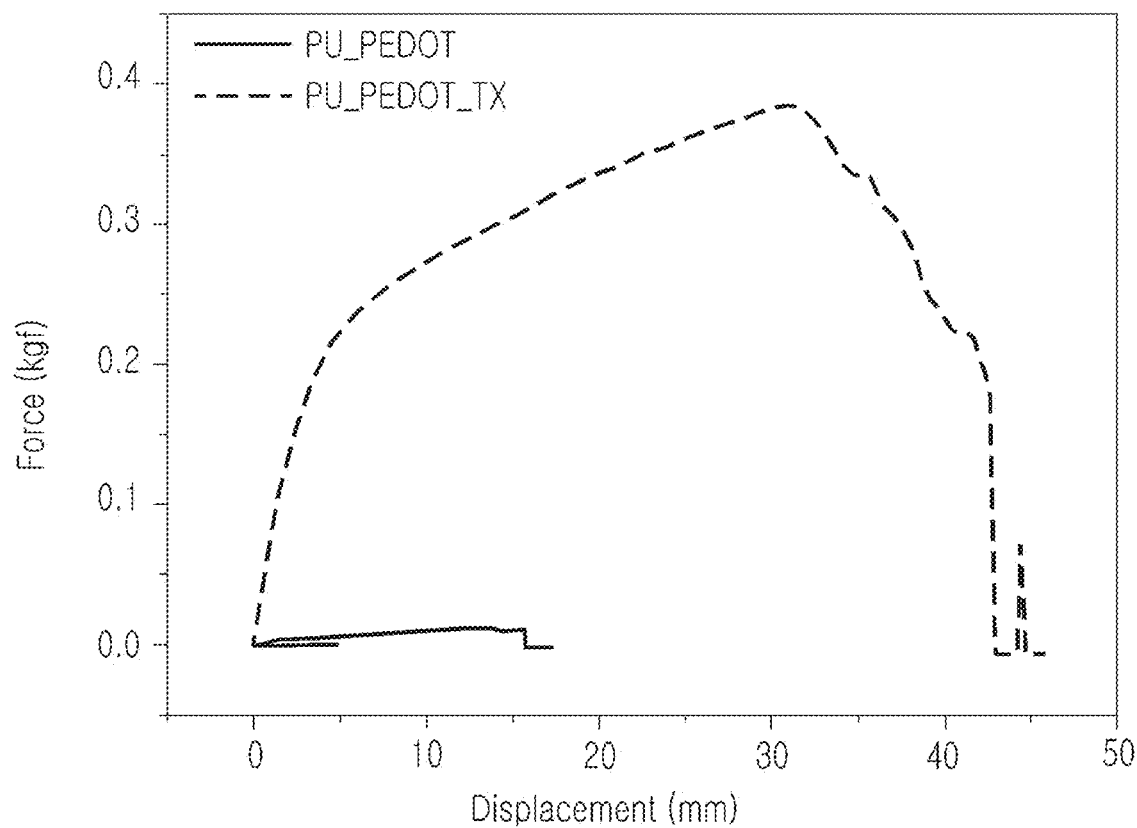
FIG. 12 is a graph showing experimental data comparing the adhesive strength of a flexible conductor according to an embodiment of the disclosure with a comparative material.

FIG. 12 is a graph showing experimental data comparing the adhesive strength of a flexible conductor according to an embodiment of the disclosure with a comparative material.

FIGS. 14A, 14B, 14C, and 14D are graphs comparing the elongation of a flexible conductor according to an embodiment of the disclosure and a conventional conductor after attachment to various substrates.

Figure 15:
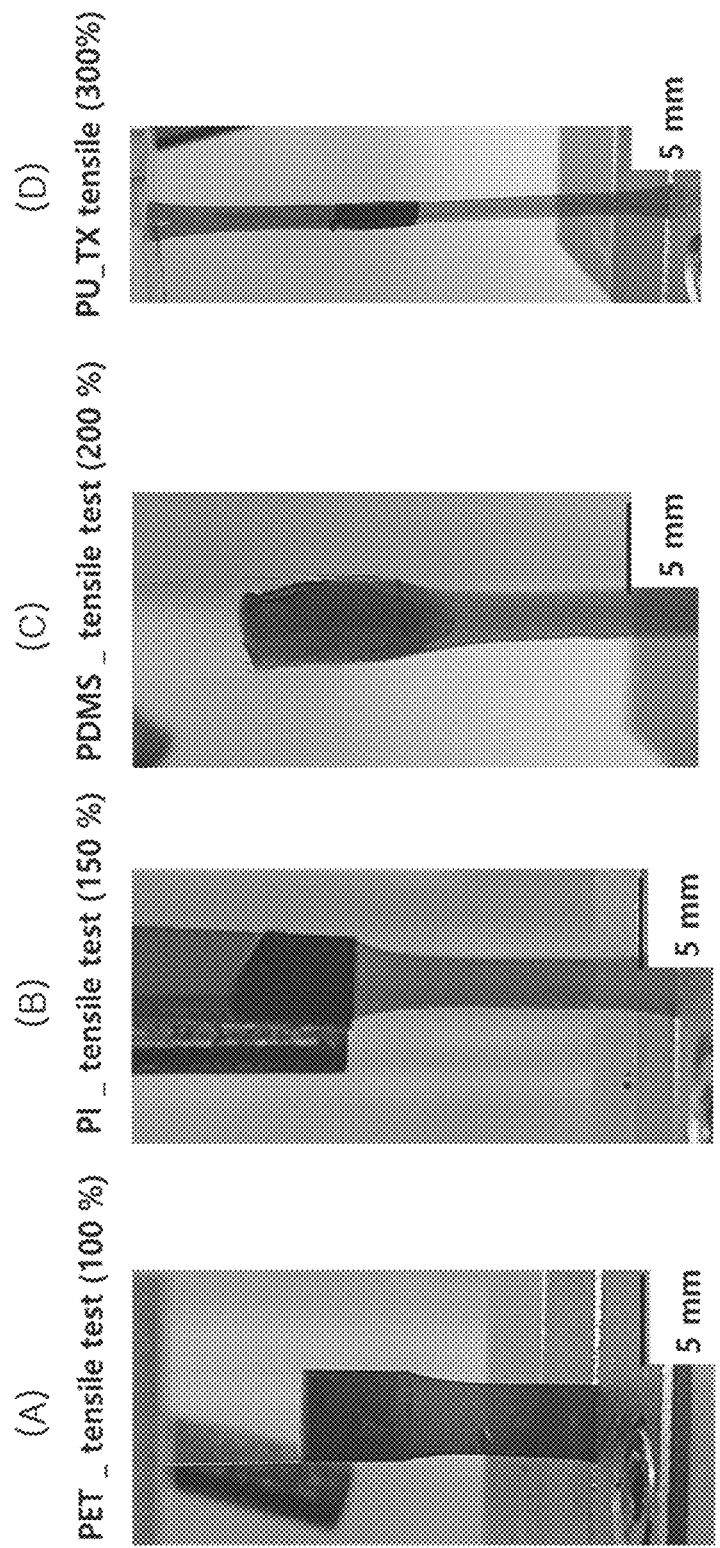
FIG. 15 is an actual photograph showing a stretching test performed after attaching a flexible conductor according to an embodiment of the disclosure to various substrates.

FIG. 15 is an actual photograph showing a stretching test performed after attaching a flexible conductor according to an embodiment of the disclosure to various substrates.

Figure 16:
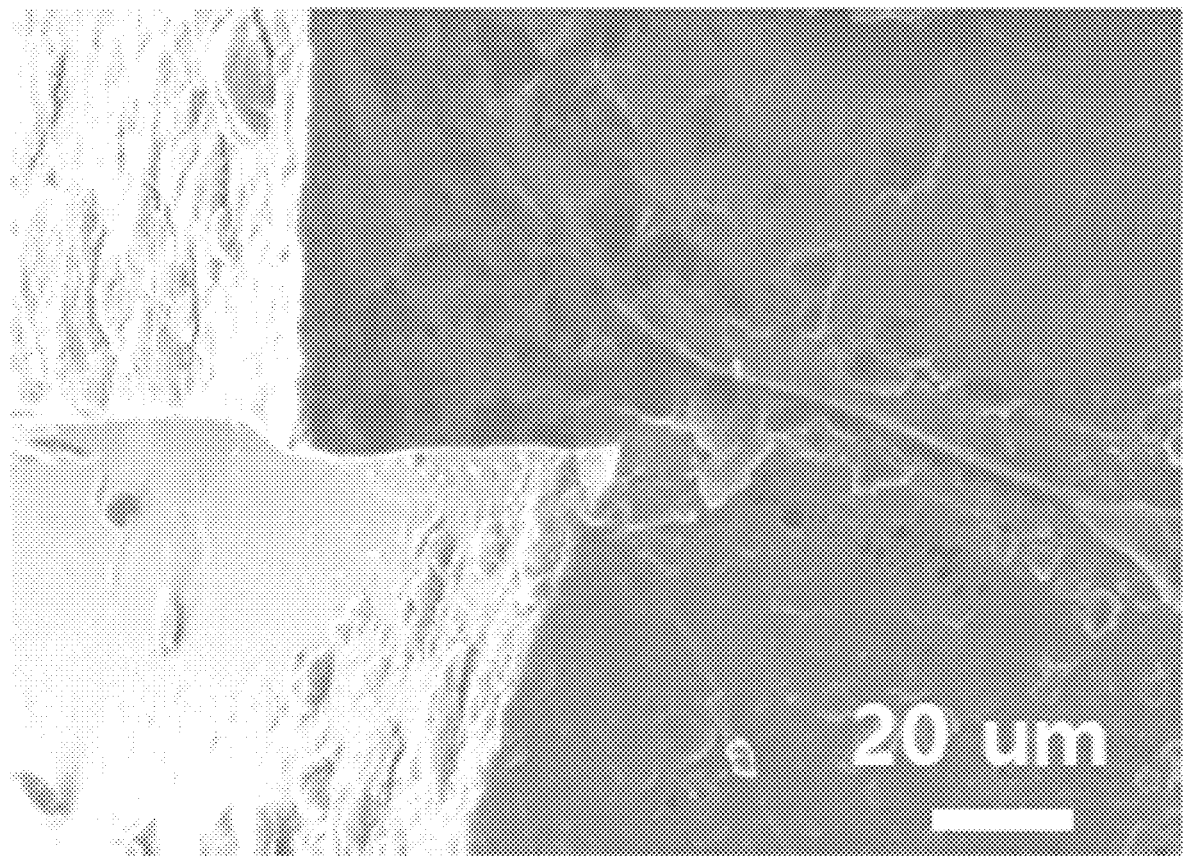
FIG. 16 is an SEM image of the interface after cutting and then reattaching a flexible conductor according to an embodiment of the disclosure.

FIG. 16 is an SEM image of the interface after cutting and then reattaching a flexible conductor according to an embodiment of the disclosure.

Referring to the drawings above, experimental example 1 will be explained.

Referring to FIG. 1, (a) shows a first flexible conductor film, (b) shows a photo of a film cut, and (c) shows cut films being glued together by cut surfaces, and self-healing back to their original state.

Referring to FIG. 2, it is possile to confirm that the flexible conductor film may be strongly bonded to various substrates by simply pressing it with your hand without any separate effort.

In addition, since it strongly adheres to substrates such as PDMS, which is mainly used for encapsulation, or PI, which is used for flexible PCBs, it may be advantageous in various aspects when manufacturing devices, and
  it has the advantage of high conductivity in both vertical and horizontal directions.

Through these features, it it possible to that it may be easily applied to device manufacturing.

Similarly, since it has good adhesive ability between conductor materials and can be bonded just by pressing it with your hand, it can be advantageously used as an interconnect of a circuit or a circuit line in a device.

Referring to FIG. 3, the experimental results of FIG. 2 may be confirmed, wherein
  this is an experiment to confirm the adhesive strength with the substrates to which the flexible conductor film was adhered after being adhered to PDMS, PI, and Wafer, respectively, and it may be confirmed that it does not fall off from various substrates and stretches, so it may be used as an interconnect material by strongly adhering to substrates used for manufacturing wearable devices and stretching.

Referring to FIG. 4, the tensile test data of a comparative material containing only PEDOT:PSS material in polyurethane and a flexible conductor (including polyurethane, PEDOT:PSS, and TRITON-X™) according to an embodiment of the disclosure may be confirmed.

In addition, in the case of the flexible conductor (including polyurethane, PEDOT:PSS, and TRITON-X™), the uncut material and the material that was cut and then re-adhered may also be compared.

Referring to the results of FIG. 4, when a strain of about 700% is applied, it may be confirmed that the comparative material containing only the PEDOT:PSS material in the polyurethane cannot withstand and breaks,
  on the other hand, in the case of the flexible conductor (including polyurethane, PEDOT:PSS, and TRITON-X™), it may be confirmed that it can still withstand well even when a strain of about 1000% is applied,
  and it can be confirmed that the material that was cut and then re-bonded has almost similar results without significant changes compared to the uncut material.

Through this, the self-healing properties of the flexible conductor according to the above embodiment may be confirmed.

Referring to FIG. 5, as confirmed in FIG. 4 above,
  the tensile test results of the flexible conductor (including polyurethane, PEDOT:PSS, and TRITON-X™) when it is not cut and when it is re-bonded after cutting may be confirmed.

Similarly, the material that is re-bonded after cutting may be confirmed to have almost similar results without significant changes compared to the material that is not cut.

Through this, the self-healing properties of the flexible conductor according to the above embodiment may be confirmed.

Referring to FIG. 6, the resistance data of the sample before and after cutting and the self-healed sample during elongation may be confirmed to be similar to the resistance change before and after cutting, so that there is no problem in using it even after cutting.

Referring to FIG. 8, the data of the resistance of the sample that was self-healed after cutting was elongated to 100% may be confirmed to be elongated while maintaining the conductivity as before cutting.

In the case of the above FIGS. 10 to 13 and FIGS. 14 to 16, experiments were conducted using a flexible conductor containing PU, PEDOT:PSS, and TRITON-X™ in a mass ratio of 10:2:1, respectively.

Referring to FIG. 10, the electrical conductivity of a comparative material containing only PEDOT:PSS material in polyurethane and a flexible conductor (containing all of polyurethane, PEDOT:PSS, and TRITON-X™) according to an embodiment of the disclosure may be compared.

Through the results of FIG. 10, it may be confirmed that the comparative material containing only PEDOT:PSS material in polyurethane has a conductivity of about 40 S/cm, whereas the flexible conductor (including polyurethane, PEDOT:PSS, and TRITON-X™) according to an embodiment of the disclosure has a very high electrical conductivity of about 110 S/cm.

Referring to FIG. 11, the resistance change rate according to the tension of the comparative material containing only PEDOT:PSS material in polyurethane and the flexible conductor (including polyurethane, PEDOT:PSS, and TRITON-X™) according to an embodiment of the disclosure may be compared.

Referring to FIG. 11, it may be confirmed that the resistance change rate of the flexible conductor (including polyurethane, PEDOT:PSS, and TRITON-X™) according to an embodiment of the disclosure is lower than the resistance change rate of the comparative material containing only PEDOT:PSS material in polyurethane, and increases more gradually.

This means that since the change in electrical conductivity is low, it may exhibit good performance even at high elongation when applied to a device.

Referring to FIG. 12, the adhesive strength of a comparative material containing only PEDOT:PSS material in polyurethane and a flexible conductor (including polyurethane, PEDOT:PSS, and TRITON-X™) according to an embodiment of the disclosure when attached to itself and vertically detached may be compared.

Referring to FIG. 12, the self-adhesive properties may be confirmed.

This means that when a plasticizer is added, the adhesive strength at the interface becomes stronger, which means that it can withstand greater force when used in a connecting portion.

Figure 14A:
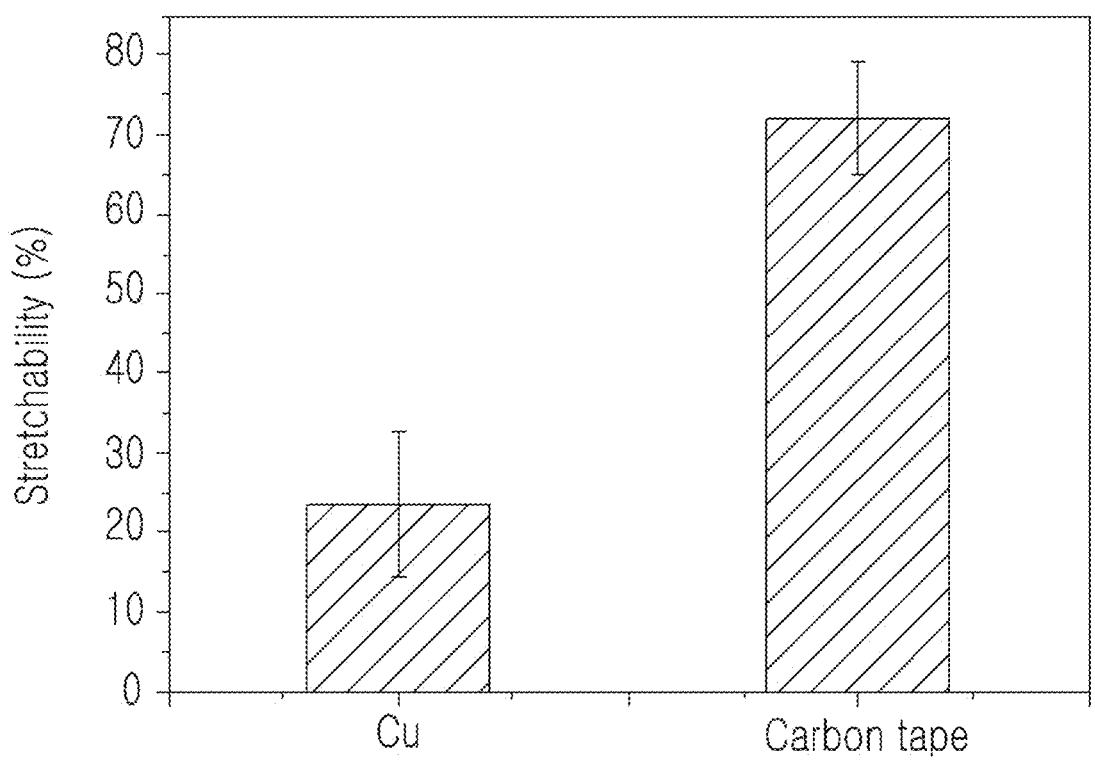
Figure 14B:
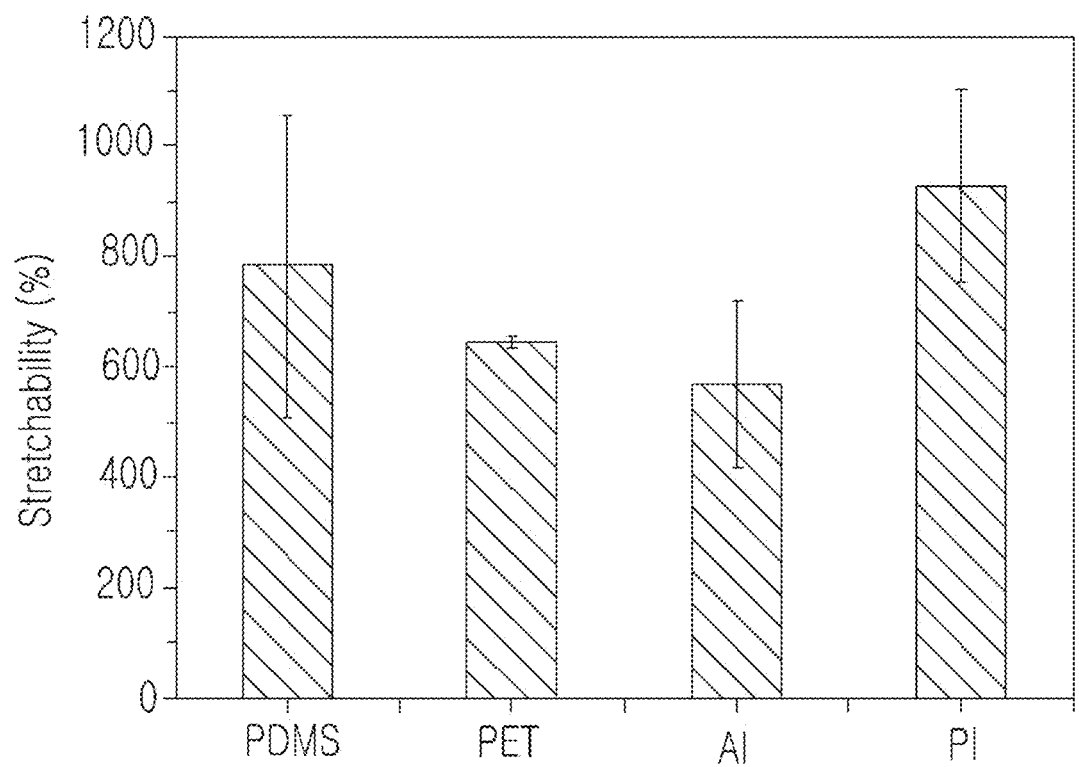

FIG. 14A is a chart showing the length increased when the conventional conductor materials Cu tape and Carbon tape are used to stretch the PDMS substrate, and FIG. 14B is a chart showing the length increased when the flexible conductor material according to one embodiment of the disclosure, in which the mass ratios of PU, PEDOT:PSS, and TRITON-X™ are each 10:2:1, is attached to various substrates and stretched.

Figure 14C:
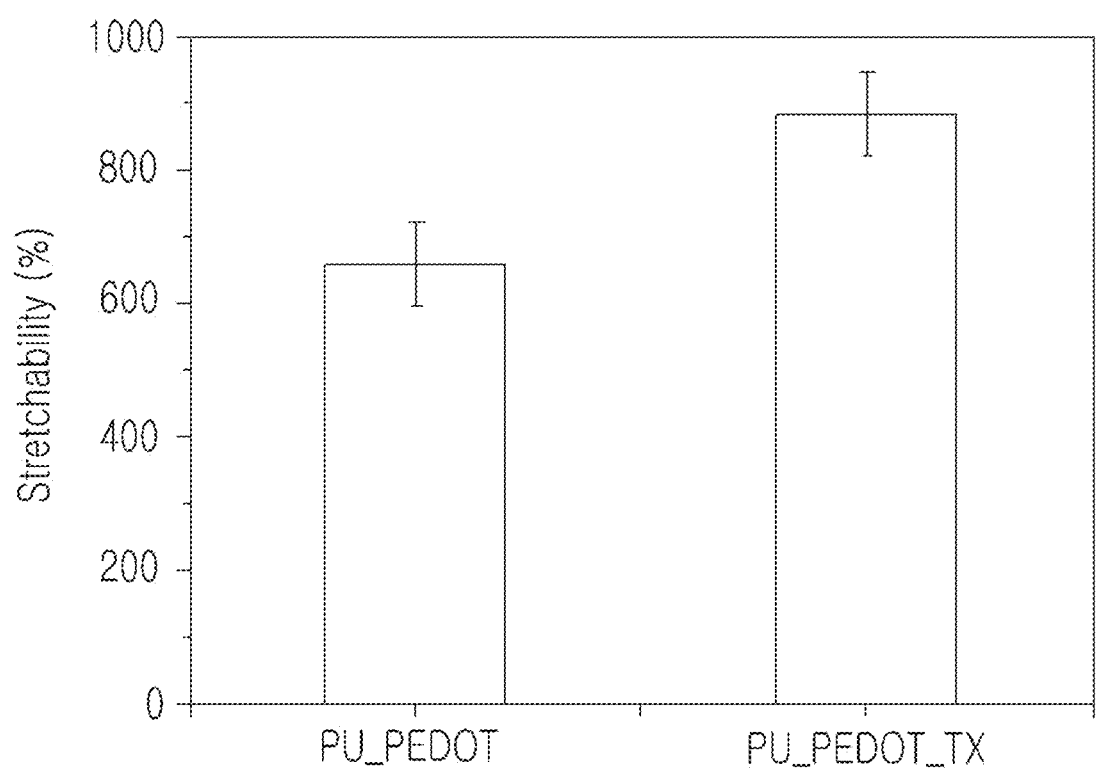

FIG. 14C is a chart comparing the length increased when attached to each other according to the presence or absence of a plasticizer (TRITON-X™).

Figure 14D:
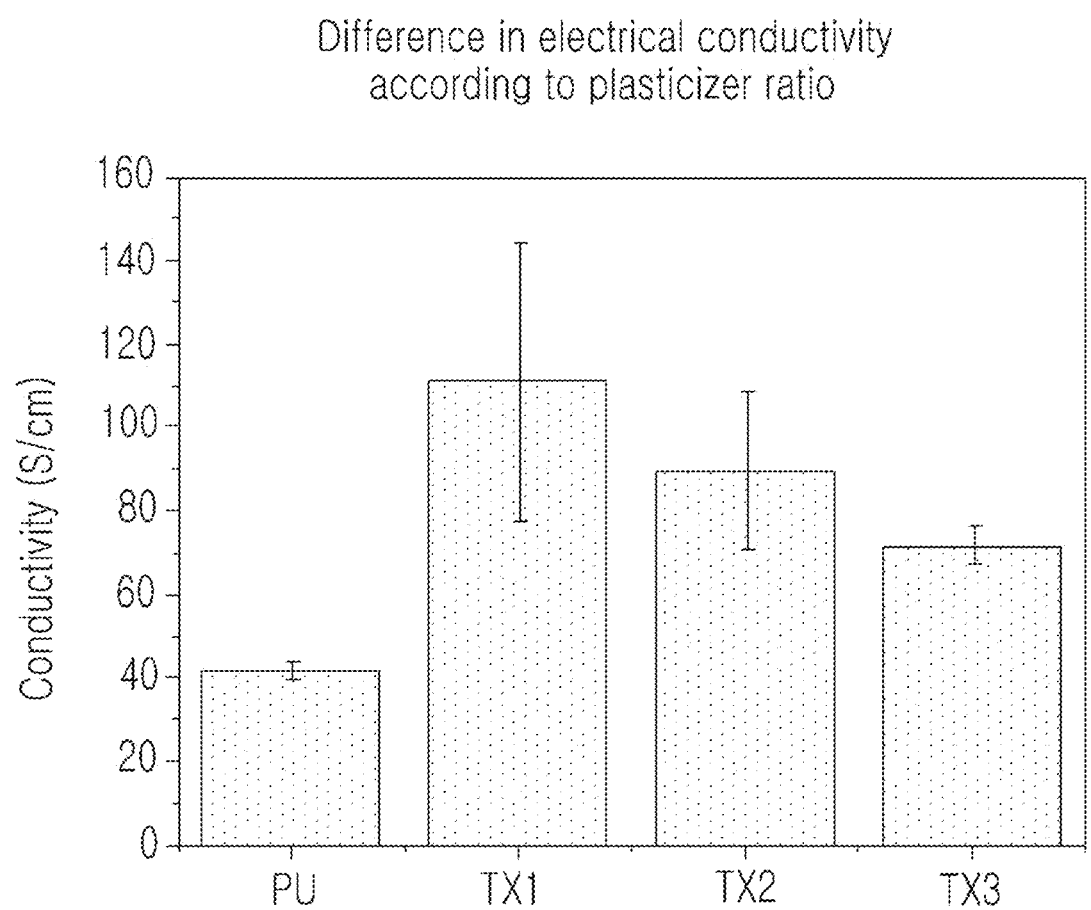

FIG. 14D is a chart comparing the values of electrical conductivity according to the ratio of the plasticizer (TRITON-X™).

Referring to FIGS. 14A and 14B, in the case of conventional conductor materials such as Cu and Carbon tape, the stretchability is at most 100% or less, whereas in the case of the flexible conductor material according to an embodiment of the disclosure, the stretchability is 600% or more in all substrates, and 800% or more in the PI substrate, confirming that the elongation characteristics are very high.

In addition, referring to FIG. 14C, it may be confirmed that there is a significant difference in the stretchability value depending on the presence or absence of the plasticizer TRITON-X™.

In the case of the absence of TRITON-X™, the elongation, which was only about 600%, increases to about 800% in the presence of TRITON-X™, confirming that the elongation is improved by about 33% or more.

Referring to FIG. 14D, it may be confirmed that the electrical conductivity is the highest when the mass ratio of TRITON-X™ is 10:1 compared to PU, which means that the resistance is the lowest when the mass ratio of TRITON-X™ is 10:1 compared to PU.

Referring to FIG. 15, the adhesive strength on various substrates may be confirmed, and in the case of the last photo, it may be confirmed that even when pulling after bonding between conductor materials, it does not break even at an elongation of 300% due to the high adhesive strength.

This means that the conductor has high adhesive strength and electrical conductivity is also maintained.

Referring to FIG. 16, an SEM image of the interface where the flexible conductor according to the above embodiment was cut and then reattached may be confirmed.

Through this, it may be confirmed that the bonded surface is self-healed and there is no trace of being cut.

Experimental Example 2. Analysis of the Results of Repeated Experiments on Flexible Conductors According to Embodiments FIG. 9 is a graph showing the resistance when repeatedly performing a tensile test of a flexible conductor according to an embodiment of the disclosure.

Figure 13:
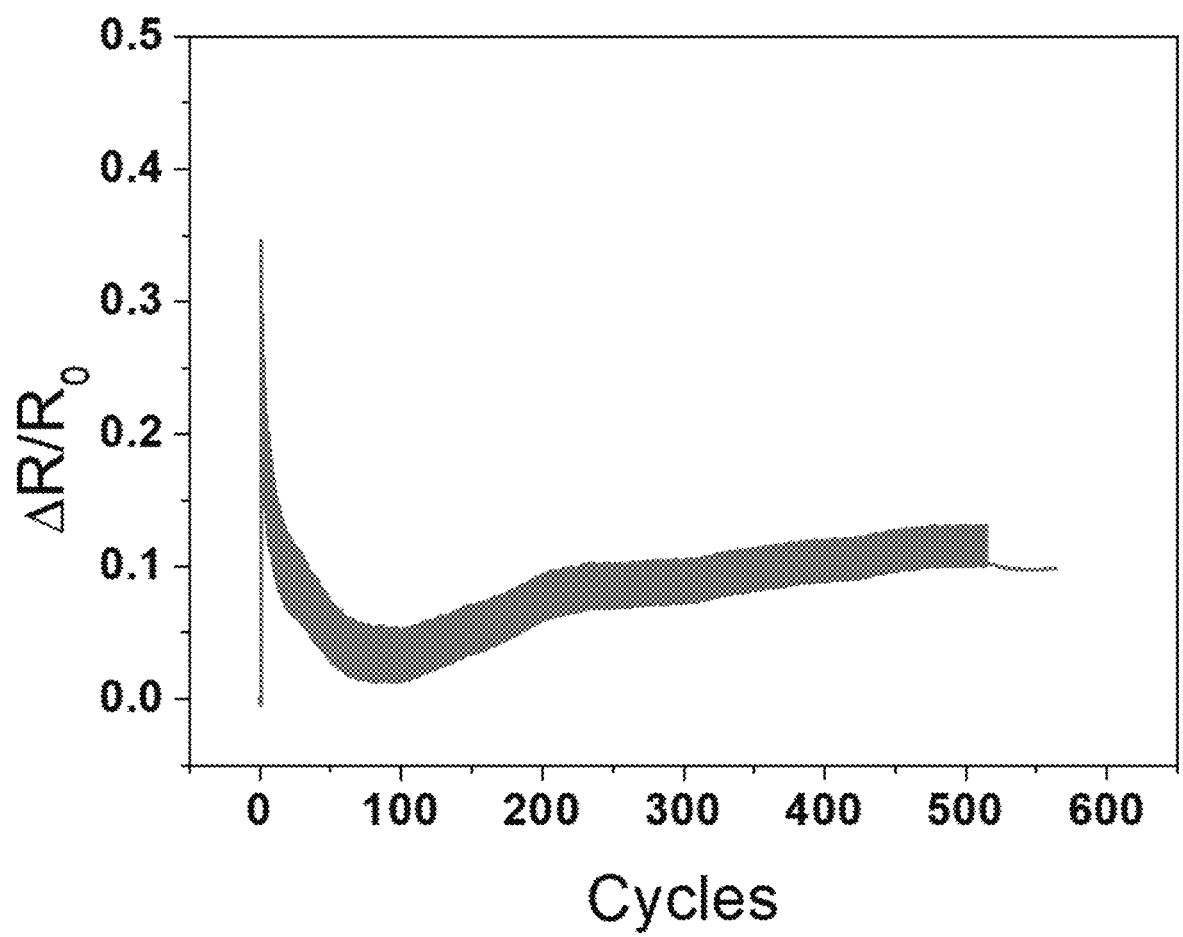
FIG. 13 is a graph showing the resistance change rate when repeatedly performing a tensile test of a flexible conductor according to one embodiment of the disclosure.

FIG. 13 is a graph showing the resistance change rate when repeatedly performing a tensile test of a flexible conductor according to one embodiment of the disclosure.

The experiment was conducted using a flexible conductor containing PU, PEDOT:PSS, and TRITON-X™ in a mass ratio of 10:2:1, respectively.

Figure 9:
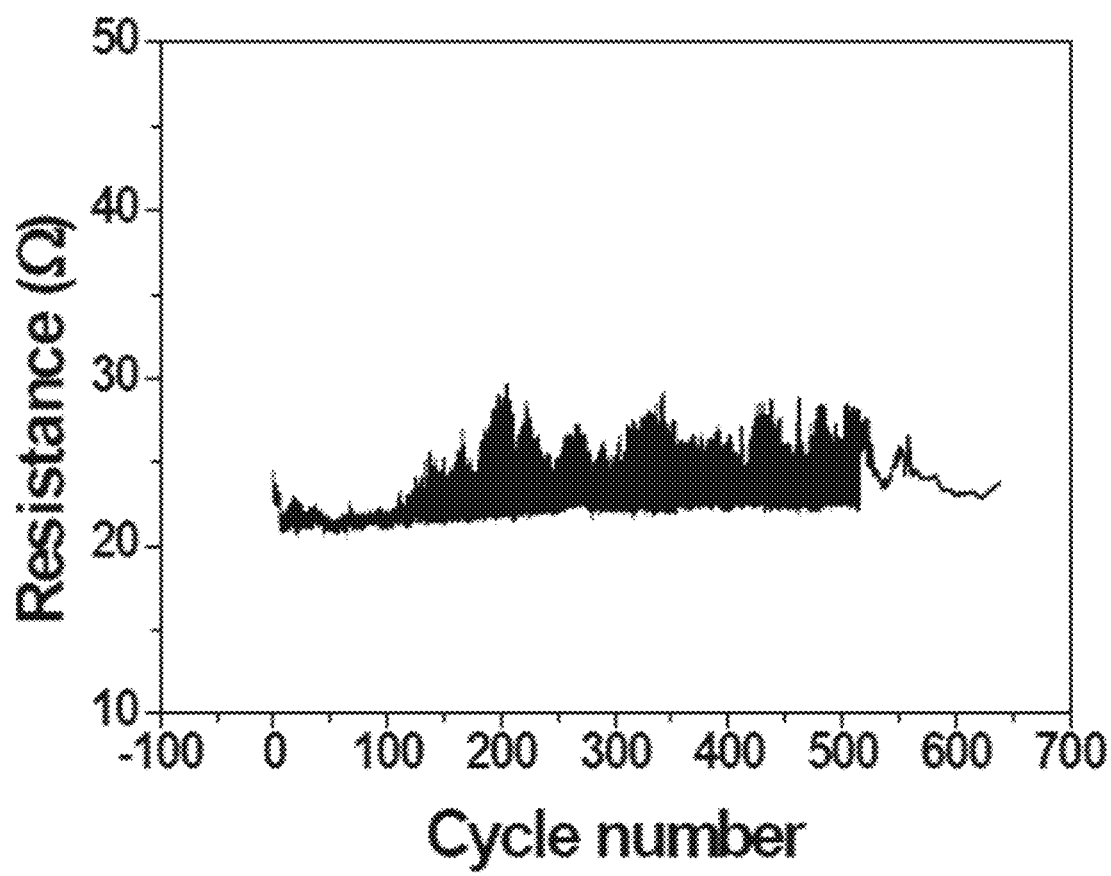
FIG. 9 is a graph showing the resistance when repeatedly performing a tensile test of a flexible conductor according to an embodiment of the disclosure.

Referring to FIG. 9, it may be confirmed that the resistance of the flexible conductor is maintained between about 20Ω and 30Ω after about 700 repetitions of the experiment with a strain of 40%.

Referring to FIG. 13, it may be confirmed that the resistance change rate of the flexible conductor is maintained below about 0.2 after about 500 repetitions of the experiment with a strain of 40%.

The experimental results indicate that the resistance change is not significant even due to repeated mechanical changes, and thus the durability of the conductor material is not impaired even when used in a device for a long time.

Experimental Example 3. Characteristics Analysis According to the Content of Flexible Conductors According to Embodiments FIGS. 7A and 7B are each a graph comparing the resistance change rate according to the content of PEDOT:PSS and plasticizer of a flexible conductor according to an embodiment of the disclosure.

Figure 7A:
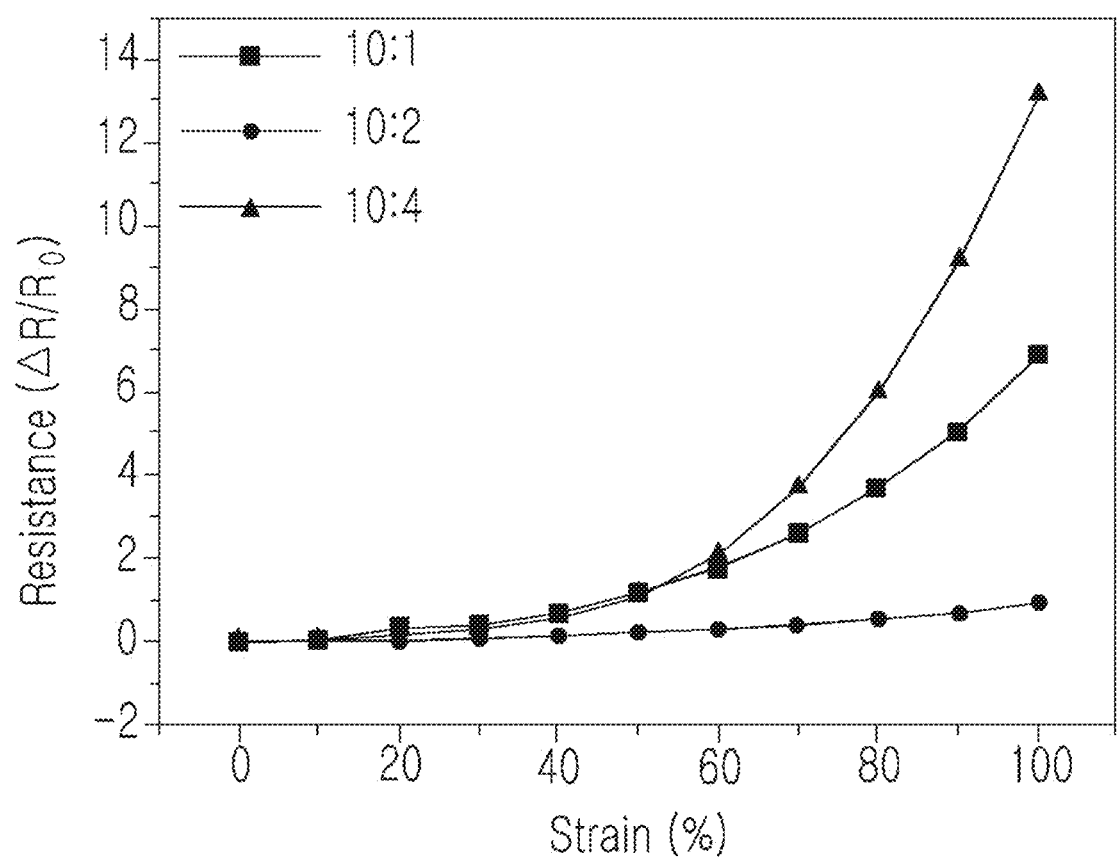
FIG. 7A is a graph comparing the resistance change rate according to the content of PEDOT:PSS and a plasticizer of a flexible conductor according to an embodiment of the disclosure, comparing the experimental results when the mass ratio of PU and TRITON-X™ is fixed at 10:1 and the ratios of PU and PEDOT:PSS are varied.
Figure 7B:
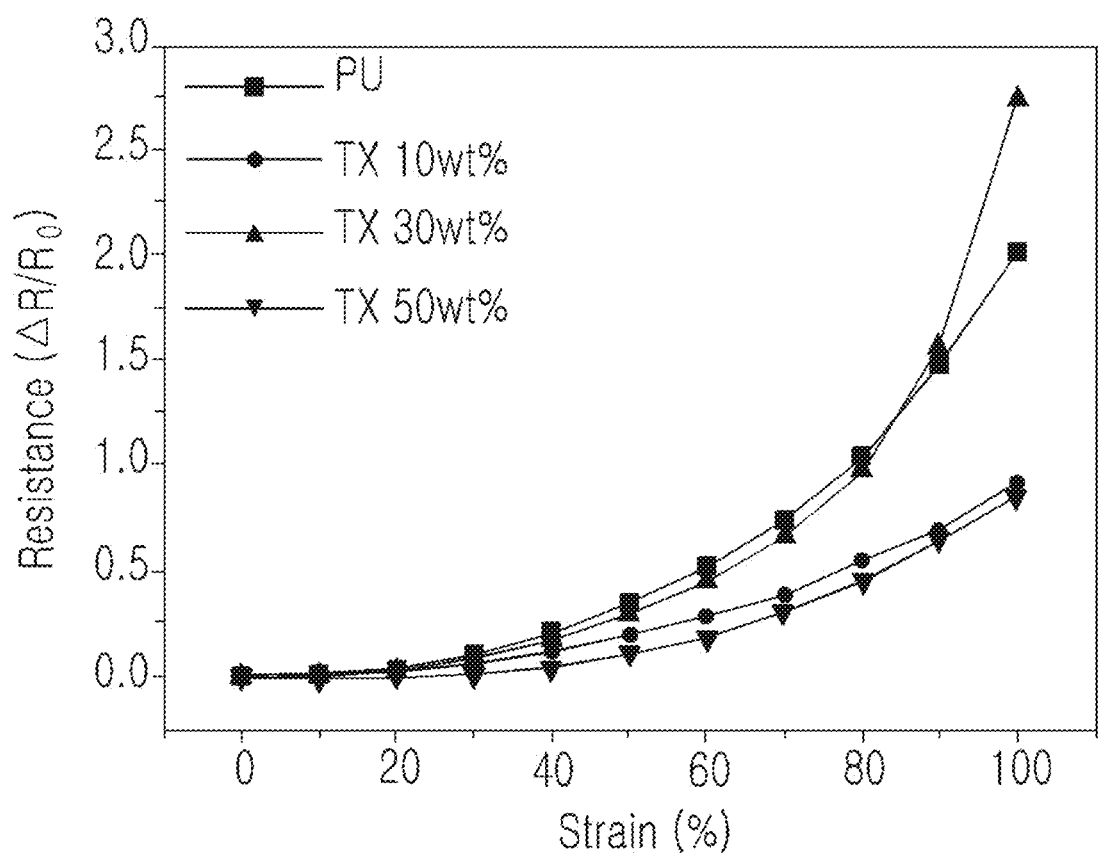
FIG. 7B is a graph comparing the resistance change rate according to the content of PEDOT:PSS and a plasticizer of a flexible conductor according to an embodiment of the disclosure, comparing the experimental results when the mass ratio of PEDOT:PSS is fixed at 10:2 and the ratios of PU and TRITON-X™ are varied.

Referring to FIG. 7A, the experimental results may be confirmed when the mass ratio of PU and TRITON-X™ is fixed at 10:1 and the ratio of PU and PEDOT:PSS is changed.

Referring to FIG. 7A, when the mass ratio of PU and PEDOT:PSS is 10:2, it may be confirmed that almost no resistance change occurs even at 100% strain, and
on the other hand, when the mass ratio of PU and PEDOT:PSS is 10:4, it may be confirmed that the resistance change rate is the highest at about 13 at 100% strain.

This means that when the mass ratio is 10:2, it is maintained evenly both mechanically and electrically, and has a low resistance change rate even at high elongation.

Referring to FIG. 7B, the experimental results may be confirmed when the mass ratio of PEDOT:PSS is fixed at 10:2 and the ratio of PU and TRITON-X™ is changed.

Referring to FIG. 7B, when the mass ratio of PU and TRITON-X™ is 10:3, it may be confirmed that it has the highest resistance change rate of about 2.75 at 100% strain, which corresponds to a higher resistance change rate than the material in which PU and PEDOT:PSS are mixed without TRITON-X™ added at all.

On the other hand, when the mass ratio of PU and TRITON-X™ is 10:1 to 10:5, it may be confirmed that the resistance change rate is less than 1 even at 100% strain, indicating that almost no resistance change occurs.

This means that when used at 10:1, it may have low resistance change and high electrical conductivity.

Table 1 and Table 2 below are tables that summarize the electrical conductivity of each conductor from the above experimental results.

TABLE 1

|  | PU:PEDOT:PSS = 10:1 | PU:PEDOT:PSS = 10:2 | PU:PEDOT:PSS = 10:4 |
|---|---|---|---|
| Electrical conductivity (S/cm) | 15 | 99 | 150 |

At this time, the mass ratio of PU and TRITON-X™ is fixed at 10:1.

TABLE 2

|  | PU:Triton-X = 10:0 | PU:Triton-X = 10:1 | PU:Triton-X = 10:3 | PU:Triton-X = 10:5 |
|---|---|---|---|---|
| Electrical conductivity (S/cm) | 41.6 | 99 | 70.9 | 67.3 |

At this time, the mass ratio of PU and PEDOT:PSS is fixed at 10:2.

Referring to Table 1 and Table 2 above and FIGS. 7A and 7B, it may be confirmed that PU:TRITON-X™:PEDOT-PSS is 10:1:2, which has high conductivity and low resistance change during tension.

Referring to Table 1 above, although the resistance is 15 in the case of PU:TRITON-X™: PEDOT-PSS of 10:1:4, which is lower than the case of 10:1:2, As described above, when the PEDOT:PSS material exceeds 40 parts by weight for 100 parts by weight of the polyurethane, the conductivity increases, but there is a problem in that it is no longer flexible.

That is, since the content of the PEDOT:PSS is too much, the conductor material does not stretch and breaks, and there is no self-adhesion, which makes it unsuitable for use as a flexible conductor material.

Referring to Table 2, it may be confirmed that the electrical conductivity is the highest when the ratio of TRITON-X™ is present at a mass ratio of 10:1 compared to PU, which means that the resistance is the lowest when the ratio of TRITON-X™ is present at a mass ratio of 10:1 compared to PU.

It may be confirmed that these results are consistent with the results of FIG. 14D.

Experimental Example 4. Verification of Biocompatible Properties of Flexible Conductors According to Embodiments FIGS. 17A, 17B, and 17C each shows the results of the Biocompatibility test.

In the test above, the positive control is a data value obtained in a natural state where no action is taken on the cell, and it is a reference point for judging the biocompatibility of the analysis target condition.

When compared to the result value in the positive control condition, if the result value in the analysis target condition is similar to or has a higher value, the subject may be considered to have Biocompatibility characteristics.

On the other hand, in the test above, the negative control refers to a condition that intentionally kills cells by administering a substance that has a negative effect on the cell.

In other words, if the analysis target condition is more helpful for proliferation, it will be more than the positive control, and if it has no effect, it will be similar to the positive control, and if it has a negative effect, it will be similar to the negative control.

Figure 17A:
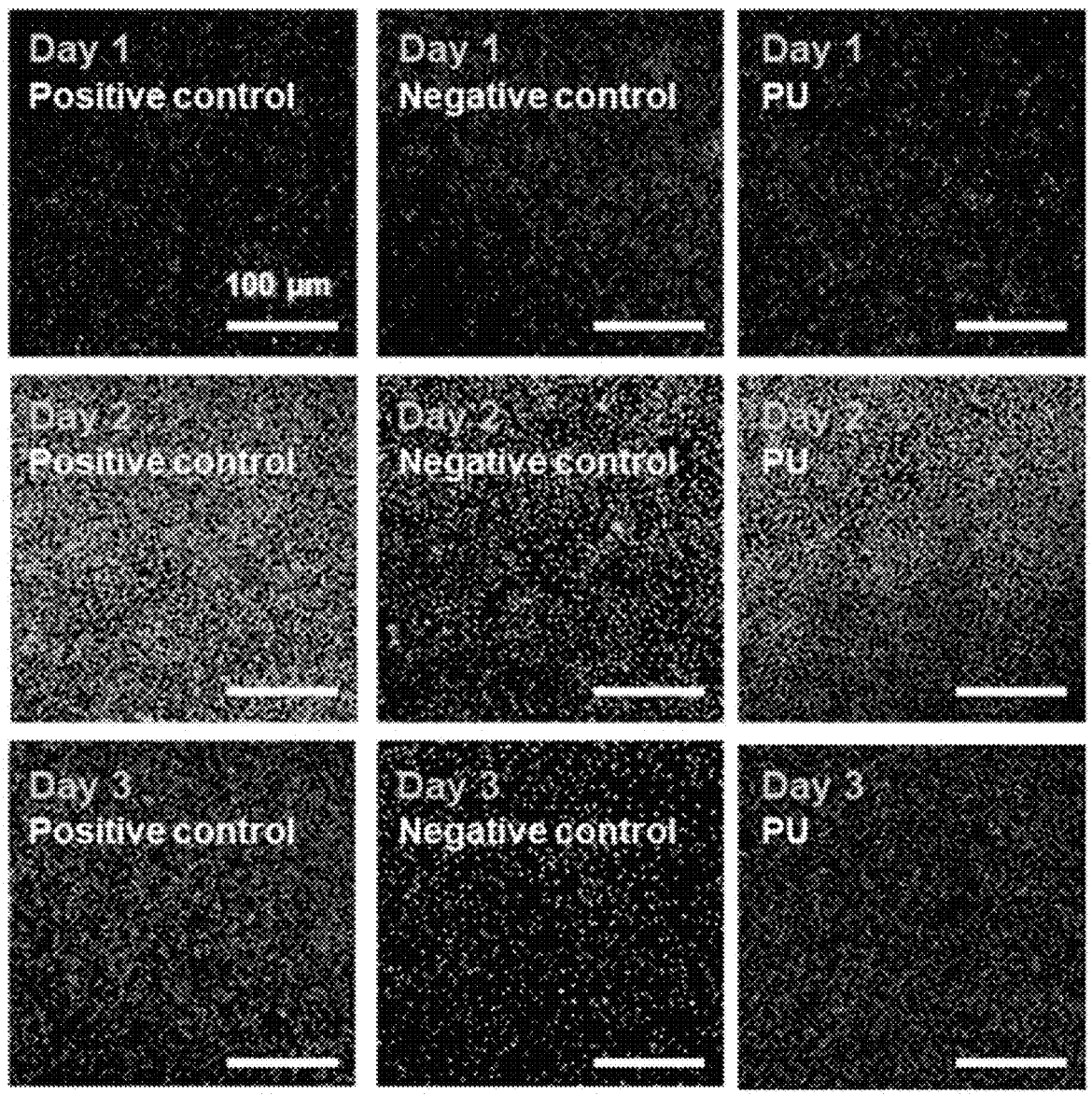

FIG. 17A is an image showing the results of the live/dead cell staining assay in which the amount of cells increasing day by day was observed under a microscope, and when referring thereto, it may be confirmed that it shows a similar aspect to the positive control, and thus it is possible to confirm biocompatibility.

Figure 17B:
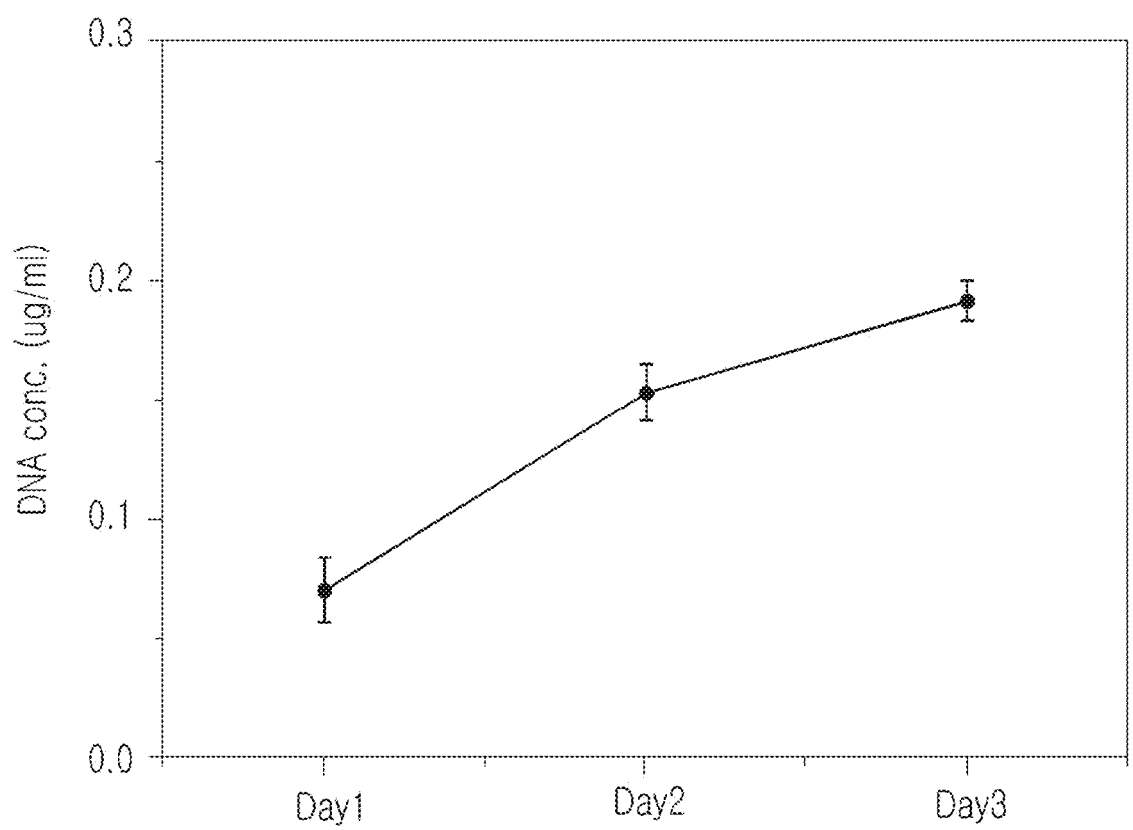

FIG. 17B is a graph showing the results of the DNA Content Assay, and
when referring thereto, it may be confirmed that the amount of cells gradually increases day by day, which means that the cells do not die and continue to divide well, and thus it is possible to confirm biocompatibility.

Figure 17C:
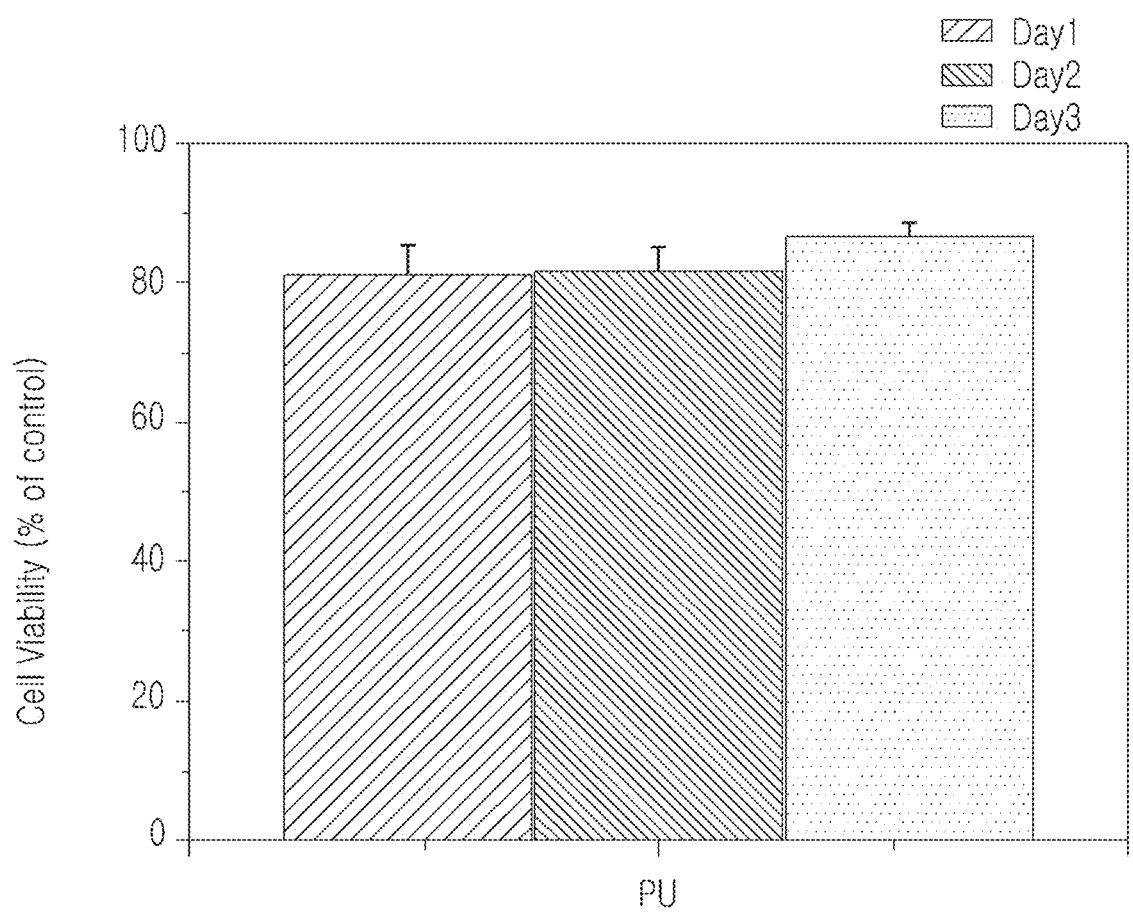

FIG. 17C is a graph showing the results of measuring cell viability through the CCK-8 Assay, and
the CCK-8 is an experiment conducted using a cell counting kit, and the number of cells may be counted to analyze cell proliferation, evaluate cytotoxicity, and evaluate cell viability.

Referring thereto, it may be confirmed that cell viability increases day by day, which means that cell division occurs well, just like FIG. 17B, and thus it is possible to confirm biocompatibility.

Figure 18:
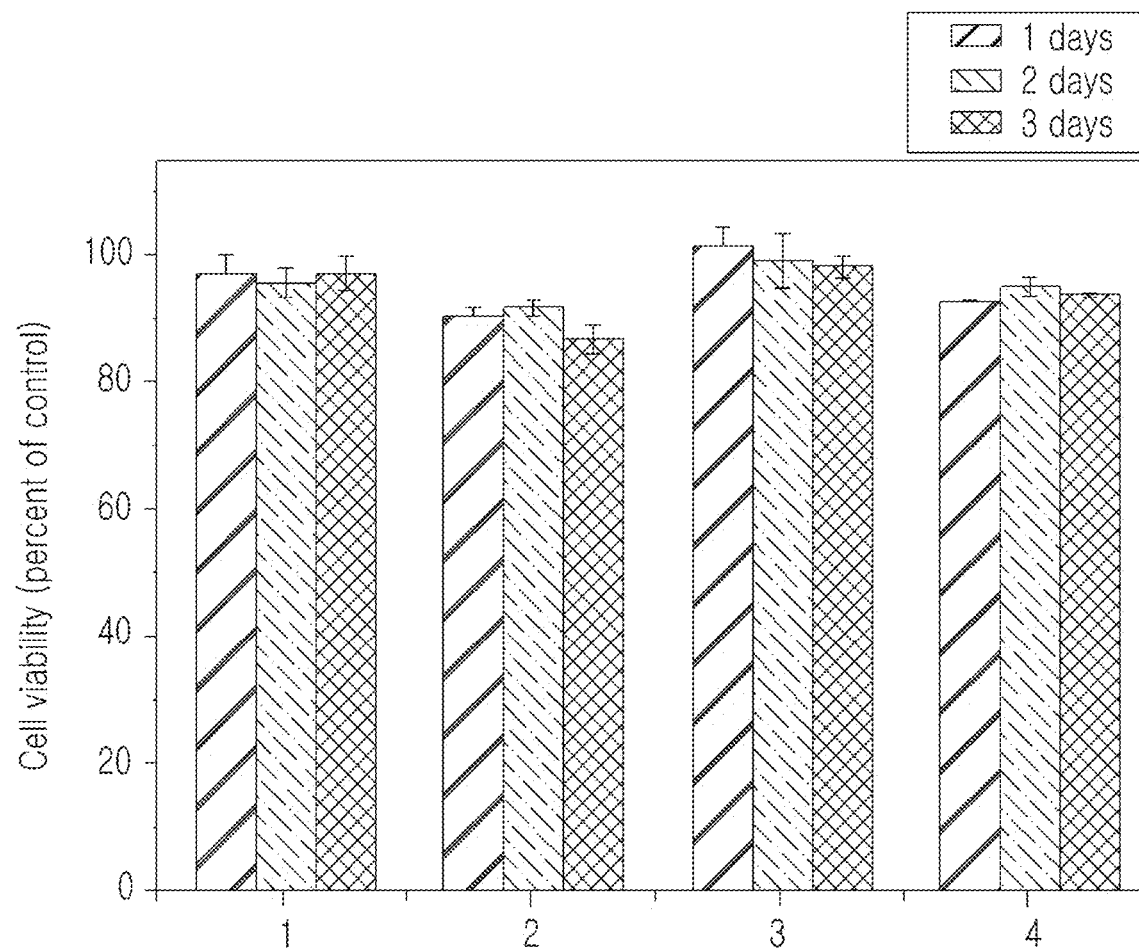
FIG. 18 is a graph showing the cell viability characteristics of a sample containing TRITON-X™ compared to a comparative example.

FIG. 18 is a graph showing the cell viability characteristics of a sample containing TRITON-X™ compared to a comparative example.

The cell line used in the experiment above is L-929 cell line, which is a mouse epithelial adipose tissue cell.

Generally, it is said that biocompatible is based on cell viability exceeding 80, and referring to FIG. 18, it may be confirmed that the cell viability of samples 1, 2, 3, and 4 is 80 or higher.

At this time, sample 1 is a sample that was cured at 40 degrees with PDMS, sample 2 is a sample that was cured at 40 degrees with 0.4 wt % TRITON-X™ added to PDMS, sample 3 is a sample that was cured at 70 degrees with PDMS, and sample 4 is a sample that was cured at 70 degrees with 0.4 wt % TRITON-X™ added to PDMS. That is, the above samples 1 and 3 can be said to be the biocompatibility of PDMS itself, and the above samples 2 and 4 can be said to be the biocompatibility of PDMS containing TRITON-X™.

Through this, it may be confirmed that even if more TRITON-X™ is added, the cell viability is not significantly different from sample 1 or 3, and the value is maintained at 80% or more on both the first and third days, so it may be confirmed that the sample according to the embodiment of the disclosure is biocompatible.

The description of the disclosure is for illustrative purposes, and those skilled in the art will understand that it can be easily modified into other specific forms without changing the technical idea or essential features of the disclosure. Therefore, the embodiments described above should be understood as being exemplary in all respects and not limiting. For example, each component described as a single type may be implemented in a distributed manner, and likewise, components described as distributed may be implemented in a combined form.

The scope of the disclosure is indicated by the following claims, and all changes or modifications derived from the meaning and scope of the claims and their equivalent concepts should be interpreted as being included in the scope of the disclosure.

What is claimed is:

1. A flexible conductor comprising:
   polyurethane;
   PEDOT:PSS; and
   a plasticizer,
   wherein the plasticizer includes polyethylene glycol tert-octylphenyl ether,
   wherein the flexible conductor comprises 10 to 40 parts by weight of the PEDOT:PSS and 10 to 50 parts by weight of the plasticizer, with respect to 100 parts by weight of the polyurethane, and
   wherein a conductivity of the flexible conductor is more than 40 S/cm, and a stretchability of the flexible conductor is more than 600%.

2. The flexible conductor of claim 1, wherein the flexible conductor comprises 20 to 25 parts by weight of the PEDOT:PSS and 10 to 30 parts by weight of the plasticizer, with respect to 100 parts by weight of the polyurethane.

3. The flexible conductor of claim 1, wherein the flexible conductor has both self-adhesive property and self-healing property.

4. The flexible conductor of claim 1, wherein the flexible conductor has a cell viability of 80% or more and is biocompatible.

5. A method for manufacturing a flexible conductor, comprising:
   providing a solution comprising polyurethane;
   adding PEDOT:PSS and a plasticizer to the solution to form a mixed solution; and
   processing the mixed solution into a film,
   wherein the plasticizer includes polyethylene glycol tert-octylphenyl ether,
   wherein in the adding the PEDOT:PSS and the plasticizer to the solution to form the mixed solution, 10 to 40 parts by weight of the PEDOT:PSS and 10 to 50 parts by weight of the plasticizer are added, with respect to 100 parts by weight of the polyurethane, and
   wherein a conductivity of the flexible conductor is more than 40 S/cm, and a stretchability of the flexible conductor is more than 600%.

6. The method of claim 5, wherein in the processing the mixed solution into the film, the mixed solution is processed into the film by at least one scheme of drying, spin coating, drop casting, spray coating, vacuum deposition, or dip coating.

7. The method of claim 5, wherein the processing the mixed solution into the film comprises at least one of manufacturing the film of a desired shape through a solution dispenser device or manufacturing the film with a desired pattern through screen printing.

8. The method of claim 5, wherein a cell viability of 80% or more is maintained to have biocompatibility.

* * * * *